United States Patent [19]
Sheridon

[11] Patent Number: 5,777,782
[45] Date of Patent: Jul. 7, 1998

[54] AUXILIARY OPTICS FOR A TWISTING BALL DISPLAY

[75] Inventor: Nicholas K. Sheridon, Los Altos, Calif.

[73] Assignee: Xerox Corporation, Stamford, Conn.

[21] Appl. No.: 777,225

[22] Filed: Dec. 24, 1996

[51] Int. Cl.⁶ .................................................. G02B 26/00
[52] U.S. Cl. ........................ 359/296; 345/107; 427/214; 349/117
[58] Field of Search .................................. 359/298, 296; 345/107, 111; 427/214; 349/117, 188

[56] References Cited

U.S. PATENT DOCUMENTS

| | | | |
|---|---|---|---|
| Re. 29,742 | 8/1978 | Tung | 2/412 |
| 2,326,634 | 8/1943 | Gebhard et al. | |
| 2,354,018 | 7/1944 | Heltzer et al. | 88/82 |
| 2,354,049 | 7/1944 | Palmquist | 40/135 |
| 2,407,680 | 9/1946 | Palmquist et al. | 88/82 |
| 2,980,547 | 4/1961 | Duval D'Adrian | 106/47 |
| 3,772,013 | 11/1973 | Wells | 359/296 |
| 3,795,435 | 3/1974 | Schwab | 350/105 |
| 3,915,771 | 10/1975 | Gatzke et al. | 156/71 |
| 4,082,426 | 4/1978 | Brown | 350/105 |
| 4,117,192 | 9/1978 | Jorgensen | 428/337 |
| 4,117,194 | 9/1978 | Barbe et al. | 428/374 |
| 4,126,854 | 11/1978 | Sheridon | 340/373 |
| 4,143,103 | 3/1979 | Sheridon | 264/4 |
| 4,229,732 | 10/1980 | Hartstein et al. | 340/378.2 |
| 4,261,653 | 4/1981 | Goodrich | 350/362 |
| 4,267,946 | 5/1981 | Thatcher | 222/345 |
| 4,311,361 | 1/1982 | Somlyody | 359/296 |
| 4,367,920 | 1/1983 | Tung et al. | 350/105 |

(List continued on next page.)

OTHER PUBLICATIONS

N. K. Sheridon and M. A. Berkovitz, "The Gyricon—A Twisting Ball Display", *Proceeding of the S. I. D*, vol. 18/3 & 4, 1977, pp. 289–293.

R. Micheletto, H. Fukada and M. Ohtsu, "A Simple Method for the Production of a Two–Dimentional, Ordered Array of Small Latex Particles", *Langmuir*, vol. 11, No. 9, May, 1995, pp. 3333–3336.

Lars A. Yoder, "The TI Digital Light Processing Micromirror Tech: Putting It To Work Now", *Advanced Imaging*, Jun. 1996, pp. 43–46.

F. Graham Smith and J.H. Thomson, *Optics*, London: John Wiley & Sons Ltd., 1971, pp. 96–99.

(List continued on next page.)

Primary Examiner—Loha Ben
Attorney, Agent, or Firm—Alexander E. Silverman

[57] ABSTRACT

A gyricon or rotating-particle display having an auxiliary optical structure. The display includes a substrate with an optically transmissive window, a plurality of particles disposed in the substrate, and an optical focusing element optically coupled to the window. Each particle has an anisotropy for providing an electrical dipole moment, the electrical dipole moment rendering the particle electrically responsive such that when the particle is rotatably disposed in an electric field while the electrical dipole moment of the particle is provided, the particle tends to rotate to an orientation in which the electrical dipole moment aligns with the field. A rotatable disposition of each particle is achievable while the particle is thus disposed in the substrate; when the particle is in this rotatable disposition, it is not attached to the substrate. Each particle, when rotatably disposed in the substrate, is disposable in first and second rotational orientations with respect to the optically transmissive window. Each particle provides a first optical modulation characteristic when disposed in its first orientation with respect to a flux of optical energy through the window, and further provides a second optical modulation characteristic when disposed in its second orientation with respect to a flux of optical energy through the window. The optical focusing element can be optically refractive; for example, it can include an array of converging lenses, such as a "fly's-eye" array of microlenses. In this case, the particles can be disposed in an array that is registered with the lens array.

21 Claims, 20 Drawing Sheets

U.S. PATENT DOCUMENTS

| | | | |
|---|---|---|---|
| 4,438,160 | 3/1984 | Ishikawa et al. | 427/214 |
| 4,441,791 | 4/1984 | Hornbeck | 350/360 |
| 4,492,435 | 1/1985 | Banton et al. | 350/360 |
| 4,511,210 | 4/1985 | Tung et al. | 350/105 |
| 4,569,857 | 2/1986 | Tung et al. | 427/163 |
| 4,592,628 | 6/1986 | Altman et al. | 350/486 |
| 4,678,695 | 7/1987 | Tung et al. | 428/120 |
| 4,713,295 | 12/1987 | Laroche | 428/406 |
| 4,721,649 | 1/1988 | Belisle et al. | 428/325 |
| 4,725,494 | 2/1988 | Belisle et al. | 428/325 |
| 4,919,521 | 4/1990 | Tada et al. | 359/296 |
| 5,039,557 | 8/1991 | White | 427/137 |
| 5,128,203 | 7/1992 | LaRoche | 428/325 |
| 5,204,772 | 4/1993 | Hirata et al. | 359/296 |
| 5,262,098 | 11/1993 | Crowley et al. | 264/8 |
| 5,344,594 | 9/1994 | Sheridon | 264/4.1 |
| 5,389,945 | 2/1995 | Sheridon | 345/85 |
| 5,549,962 | 8/1996 | Holmes et al. | 428/144 |

OTHER PUBLICATIONS

H.–J. J. Yeh and J. S. Smith. "Fluidic Self–Assembly for the Integration of GaAs Light–Emitting Diodes on Si Substrates."*IEEE Photonics Technology Letters,* vol. 6, No. 6, Jun. 1994, pp. 706–708.

Monolithic Lenslet Modules (product brochure), Micro–Optics Group, United Technologies Adaptive Optics Associates, Cambridge, Massachusetts, Jun. 1992.

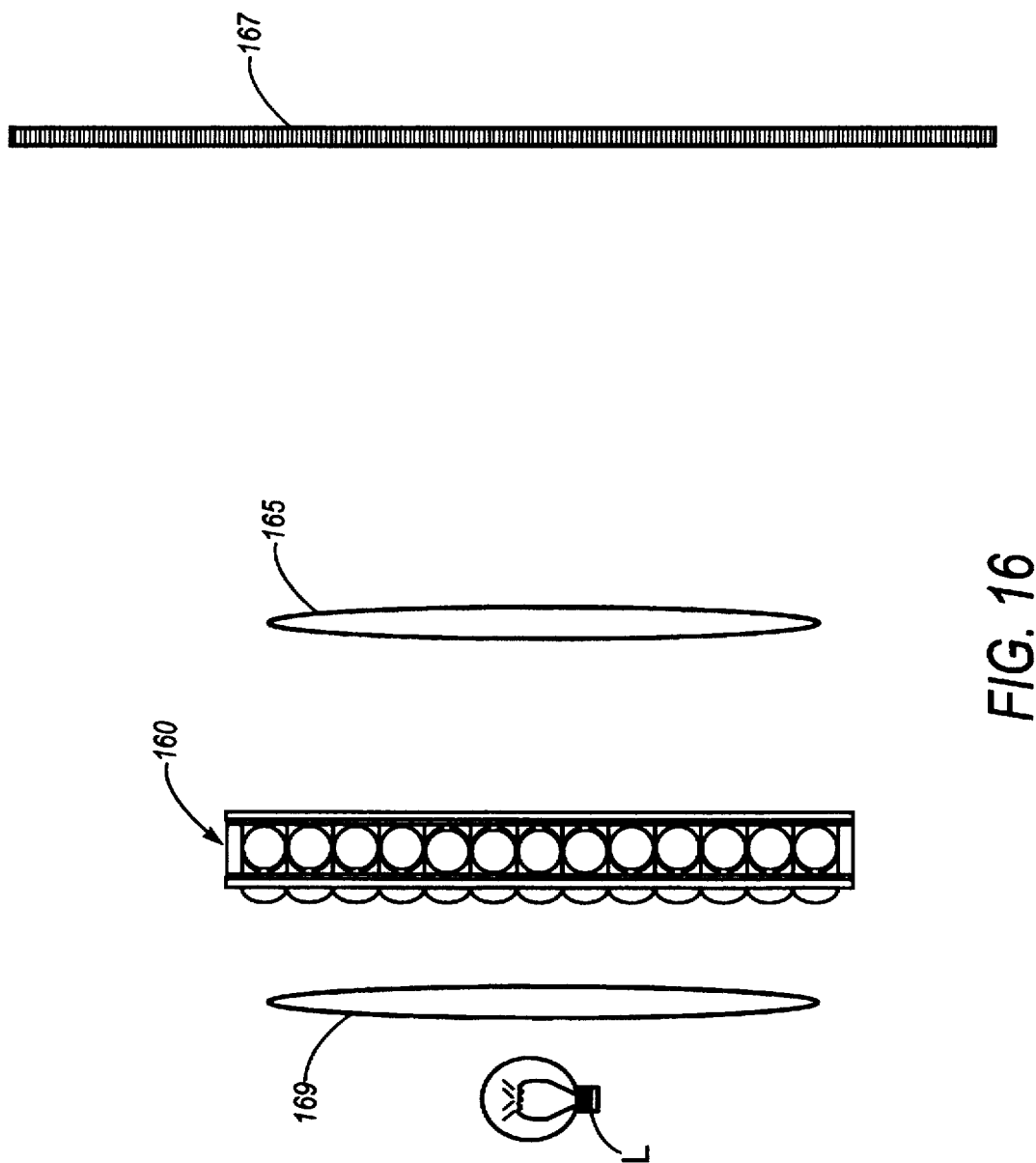

AUXILIARY OPTICS FOR A TWISTING BALL DISPLAY

INCORPORATION BY REFERENCE

The following U.S. patents are fully incorporated herein by reference: U.S. Pat. No. 4,126,854, (Sheridon, "Twisting Ball Panel Display"); U.S. Pat. No. 4,143,103 (Sheridon, "Method of Making a Twisting Ball Panel Display"); U.S. Pat. No. 5,075,186 (Sheridon, "Image-Wise Adhesion Layers for Printing"); U.S. Pat. No. 5,262,098 (Crowley et al., "Method and Apparatus for Fabricating Bichromal Balls for a Twisting Ball Display"); U.S. Pat. No. 5,344,594 (Sheridon, "Method for the Fabrication of Multicolored Balls for a Twisting Ball Display"); and U.S. Pat. No. 5,389,945 (Sheridon, "Writing System Including Paper-Like Digitally Addressed Media and Addressing Device Therefor").

RELATED PATENT APPLICATIONS

The following copending, coassigned U.S. patent applications are related to this case:

U.S. patent application Ser. No. 08/773,667 (Attorney Docket No. D/93502), entitled "Rotatable Lens Transmissive Twisting Ball Display";

U.S. patent application Ser. No. 08/773,664 (Attorney Docket No. D/93502Q2), entitled "'Eggcrate' Substrate for a Twisting Ball Display."

BACKGROUND OF THE INVENTION

The present invention relates to visual displays, and more particularly to addressable, reusable, paper-like visual displays, and to gyricon or twisting-ball displays.

Since ancient times, paper has been a preferred medium for the presentation and display of text and images. The advantages of paper as a display medium are evident. For example, it is lightweight, thin, portable, flexible, foldable, high-contrast, low-cost, relatively permanent, and readily configured into a myriad of shapes. It can maintain its displayed image without using any electricity. Paper can be read in ambient light and can be written or marked upon with a pen, pencil, paintbrush, or any number of other implements, including a computer printer.

Unfortunately, paper is not well suited for real-time display purposes. Real-time imagery from computer, video, or other sources cannot be displayed directly with paper, but must be displayed by other means, such as by a cathode-ray tube (CRT) display or a liquid-crystal display (LCD). Typically, real-time display media lack many of the desirable qualities of paper, such as physical flexibility and stable retention of the displayed image in the absence of an electric power source. Attempts have been made to combine the desirable qualities of paper with those of real-time display media in order to create something that offers the best of both worlds. That something can be called electric paper.

Like ordinary paper, electric paper preferably can be written and erased, can be read in ambient light, and can retain imposed information in the absence of an electric field or other external retaining force. Also like ordinary paper, electric paper preferably can be made in the form of a lightweight, flexible, durable sheet that can be folded or rolled into tubular form about any axis and conveniently placed into a shirt or coat pocket, and then later retrieved, restraightened, and read substantially without loss of information. Yet unlike ordinary paper, electric paper preferably can be used to display full-motion and other real-time imagery as well as still images and text. Thus it is adaptable for use in a computer system display screen or a television.

The gyricon display, also called the twisting-ball display, rotary ball display, particle display, dipolar particle light valve, etc., offers a technology for making a form of electric paper. Briefly, a gyricon display is an addressable display made up of a multiplicity of optically anisotropic balls, each of which can be selectively rotated to present a desired face to an observer. For example, a gyricon display can incorporate balls each having two distinct hemispheres, one black and the other white, with each hemisphere having a distinct electrical characteristic (e.g., zeta potential with respect to a dielectric fluid) so that the balls are electrically as well as optically anisotropic. The black-and-white balls are embedded in a sheet of optically transparent material, such as an elastomer layer, that contains a multiplicity of spheroidal cavities and is permeated by a transparent dielectric fluid, such as a plasticizer. The fluid-filled cavities accommodate the balls, one ball per cavity, so as to prevent the balls from migrating within the sheet. A ball can be selectively rotated within its respective fluid-filled cavity, for example by application of an electric field, so as to present either the black or the white hemisphere to an observer viewing the surface of the sheet. Thus, by application of an electric field addressable in two dimensions (as by a matrix addressing scheme), the black and white sides of the balls can be caused to appear as the image elements (e.g., pixels or subpixels) of a displayed image.

An exemplary gyricon display 10 is shown in side view in FIG. 1 (PRIOR ART). Bichromal balls 11 are disposed in an elastomer substrate 12 that is swelled by a dielectric fluid creating cavities 13 in which the balls 11 are free to rotate. The balls 11 are electrically dipolar in the presence of the fluid and so are subject to rotation upon application of an electric field, as by matrix-addressable electrodes 14a, 14b. The electrode 14a closest to viewing surface 15 is preferably transparent. An observer at I sees an image formed by the black and white pattern of the balls 11 as rotated to expose their black or white faces (hemispheres) to the viewing surface 15 of substrate 12. Gyricon display technology is described further in the patents incorporated by reference hereinabove. In particular, U.S. Pat. No. 5,389,945 (Sheridon, "Writing System Including Paper-Like Digitally Addressed Media and Addressing Device Therefor") shows that gyricon displays can be made that have many of the desirable qualities of paper, such as flexibility and stable retention of a displayed image in the absence of power, not found in CRTs, LCDs, or other conventional display media. Gyricon displays can also be made that are not paper-like, for example, in the form of rigid display screens for flat-panel displays.

Typically, known gyricon displays are made up of bichromal balls that are black in one hemisphere and white in the other. Other kinds of balls are also known. For example, U.S. Pat. No. 4,261,653 (Goodrich) shows a multilayer ball, although it is made at least in part from glass and its use depends on an addressing scheme involving high-frequency electric fields.

Although the gyricon display represents an important step toward the goal of electric paper, there is still a long way to go. For example, a gyricon display constructed of black-and-white balls cannot provide a multicolor image. As another example, a gyricon display designed to operate in ambient reflected light cannot provide a projective or transmissive display. What is needed is an advanced gyricon display technology that can provide a more full range of display capabilities and, in particular, can provide color projective and transmissive imaging.

SUMMARY OF THE INVENTION

The invention provides a gyricon or rotating-particle display having an auxiliary optical structure. More particularly in one aspect of the invention, an apparatus is provided including a substrate with an optically transmissive window, a plurality of particles disposed in the substrate, and an optical focusing element optically coupled to the window. Each particle has an anisotropy for providing an electrical dipole moment, the electrical dipole moment rendering the particle electrically responsive such that when the particle is rotatably disposed in an electric field while the electrical dipole moment of the particle is provided, the particle tends to rotate to an orientation in which the electrical dipole moment aligns with the field. A rotatable disposition of each particle is achievable while the particle is thus disposed in the substrate; when the particle is in this rotatable disposition, it is not attached to the substrate. Each particle, when rotatably disposed in the substrate, is disposable in first and second rotational orientations with respect to the optically transmissive window. Each particle provides a first optical modulation characteristic when disposed in its first orientation with respect to a flux of optical energy through the window, and further provides a second optical modulation characteristic when disposed in its second orientation with respect to a flux of optical energy through the window. The focusing element can be optically refractive; for example, it can include an array of converging lenses, such as a "fly's-eye" array of of microlenses. In this case, the particles can be disposed in an array that is registered with the lens array.

The invention will be better understood with reference to the drawings and detailed description below. In the drawings, like reference numerals indicate like components.

BRIEF DESCRIPTION OF THE DRAWINGS

FIG. 16 is a schematic view of an optical projection system incorporating a transmissive gyricon display device of the invention;

DETAILED DESCRIPTION OF SPECIFIC EMBODIMENTS

Overview

The invention provides a new class of gyricon devices that are especially well-suited for transmissive imaging. Whereas a bichromal-ball gyricon display of the prior art is limited in use to the ambient light valve or reflective mode, in which the display modulates light by varying the optical reflectivity of sections of an image-forming surface, the present invention functions in the light transmission or projection mode, and is designed to transmit or obscure the passage of light through it in an imagewise manner.

Typically, in the embodiments to be described, the invention includes these three components:

(1) an array of rotatable lens imaging elements, such as spherical lenses having aperture masks or aperture stops;

(2) auxiliary optics used to help focus light in conjunction with the rotatable lenses, such as a "fly's-eye" array of converging lenses; and (3) an eggcrate substrate that helps to ensure accurate placement of the rotatable lens imaging elements within their array, and thereby helps to facilitate proper alignment (that is, registration) of the imaging element array with the lenses of the auxiliary optics array.

Figure 1:
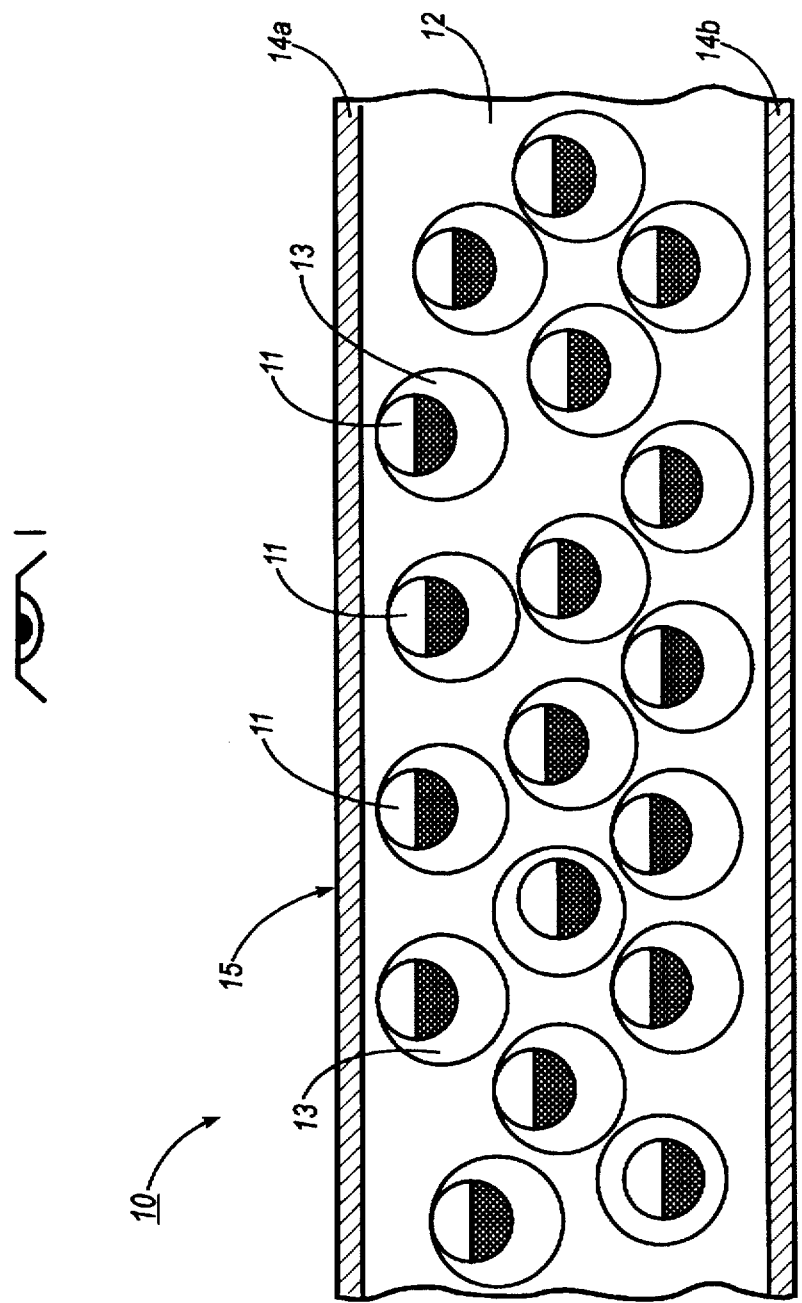
FIG. 1 is a cutaway side view of an exemplary black-and-white gyricon display in the PRIOR ART.
Figure 2:
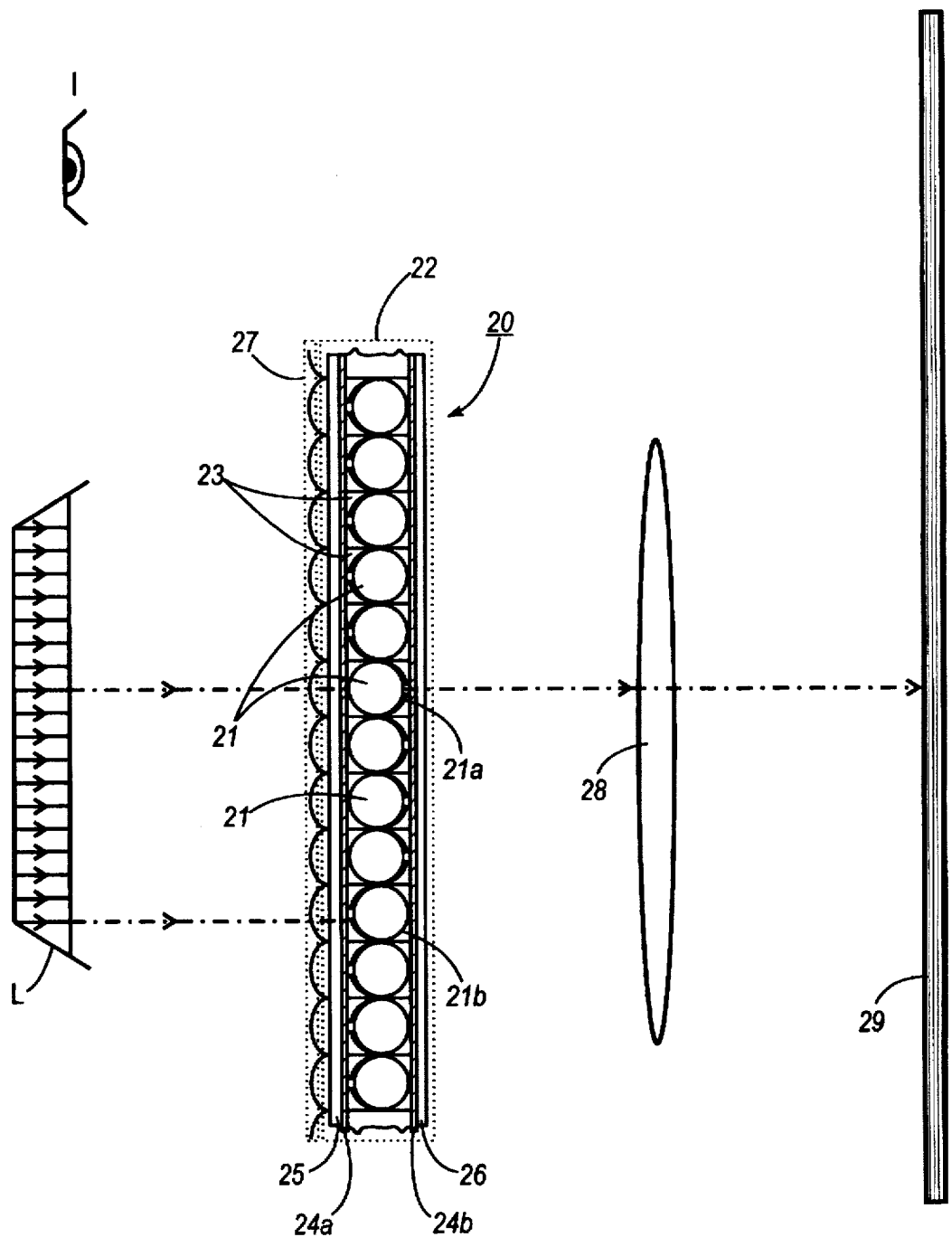
FIG. 2 is a cutaway side view of an exemplary gyricon display of the invention.

To motivate the discussion that follows, it is helpful to begin with an example of the inventive display in one embodiment, as shown in FIG. 2. Display 20 is similar in some respects to the known gyricon display 10 that was illustrated in FIG. 1 (PRIOR ART). Notably, display 20 has spherical balls 21 rotatably disposed in fluid-filled cavities 23 within a substrate 22, the balls 21 being rotatable within their respective cavities. Each of balls 21 is optically anisotropic. Also, each of balls 21 is electrically dipolar in the presence of the fluid and so is subject to rotation upon application of an electric field, as by matrix-addressable electrodes 24a, 24b.

However, the imaging elements of the inventive display are quite different from those found in previous gyricon displays (e.g., from the bichromal balls 11 of display 10). The imaging elements of display 20 are rotatable spherical lenses. Each of balls 21 in display 20 can act as a tiny lens, and so can be used to focus incoming light. Depending on the type of lens used, as described below, different optical effects can be achieved. For example, if an aperture-mask type of lens is used, then each ball can be rotated to a first orientation in which the ball focuses and transmits incoming light, and also to a second orientation in which the ball blocks incoming light.

Together, the lens array provided by balls 21 can be used to form an image. For example (and once again assuming aperture-mask type balls), balls such as those at 21a are rotated so as to present their transmissive aspects toward a light-entry surface 25 of substrate 22 and thus toward light coming from a light source at L, here shown as a collimated beam of light. These balls 21a focus the incoming light from L so that the light emerges from light-exit surface 26. The auxiliary optics, here shown as an array 27 of converging lenses disposed between light source L and balls 21, helps the light to be focused correctly as is described below. Balls such as those at 21b are rotated so as to present their nontransmissive aspects toward light-entry surface 25 of substrate 22. Light from source L that encounters these balls via array 27 can be absorbed or reflected (depending on choice of aperture mask materials) at their surfaces, but in any event is blocked and not transmitted. An image of the focused, transmitted light pattern of balls 21 can be formed, as by projection of the transmitted light through a projection lens 28 onto a viewing screen 29. The projected image can, in turn, be seen by a favorably situated observer at I.

Both of the addressing electrodes 24a, 24b are transparent. For example, they can be made from indium/tin oxide (ITO). The electrode 24b closest to light-entry is placed next to or as a coating on light-entry surface 25, as shown, so that it is as close to balls 22 as possible, thus minimizing the necessary drive voltage.

Substrate 22 of display 20 is an eggcrate substrate having a regular pattern of pre-formed cavities, here shown as cylindrical cavities. In both its structure and its manufacture, substrate 22 differs from substrate 12 of known display 10. Substrate 12 has spherical cavities 13 that are formed around balls 11: first, balls 11 are embedded in substrate 12, and then a dielectric fluid is applied to substrate 12, causing substrate 12 to swell, so that the cavities 13 form wherever the balls 11 happen to be. By contrast, in substrate 22 of display 20, cavities 23 are wholly or partially pre-formed, and then balls 21 are placed into the cavities, in a manner that is described below. In other words, the cavities 23 are formed first, and the balls 21 end up wherever the cavities are, instead of the other way around.

The regularity of the eggcrate structure of substrate 22 ensures that balls 21 are arranged in a highly regular fashion. This facilitates the fabrication of display 20, because it is much easier to place (that is, register) auxiliary optics lens array 27 with respect to the array of balls 21 so as to focus the light properly through each of balls 21, than would be the case if balls 21 were not so regularly arranged.

The remainder of the description is organized as follows: First, an explanation of the optics of spherical lenses is given. Then the rotatable lens, auxiliary optics, and eggcrate substrate components of the inventive display are described more fully. Thereafter, several embodiments of the invention are illustrated, showing in particular how the inventive technology can be used to make monochrome and color displays. Finally, some variations and extensions of the inventive technology are presented.

A Tutorial on Spherical Lens Optics

The rotatable lenses of the present invention can be built from transparent spheres, such as glass, plastic, or epoxy spheres. A transparent sphere has optically refractive properties that depend on the medium in which the sphere is disposed. In particular, if the sphere is made of a material having an index of refraction that is greater than the index of refraction of the surrounding medium, the sphere acts like a converging lens.

Figure 3:
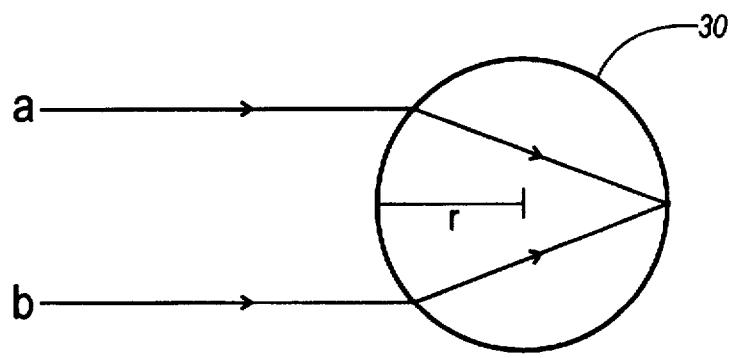
FIG. 3 illustrates refraction of light by a spherical lens ball in air.
Figure 4A:
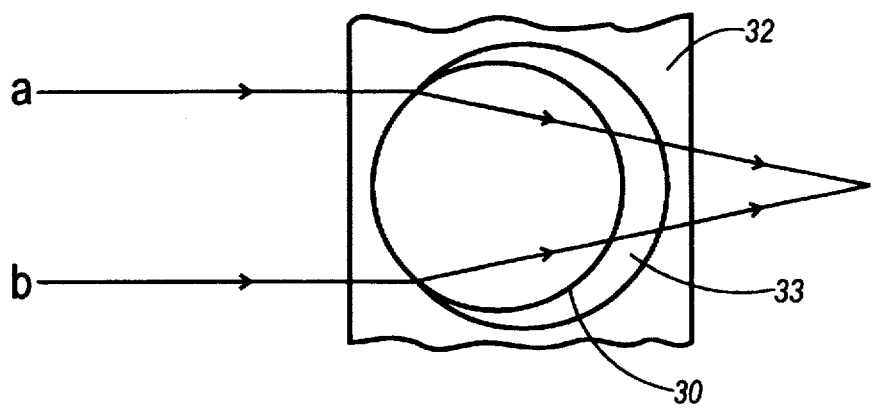
FIG. 4A illustrates refraction of light by a spherical lens ball in a fluid-filled cavity of an elastomer.
Figure 4B:
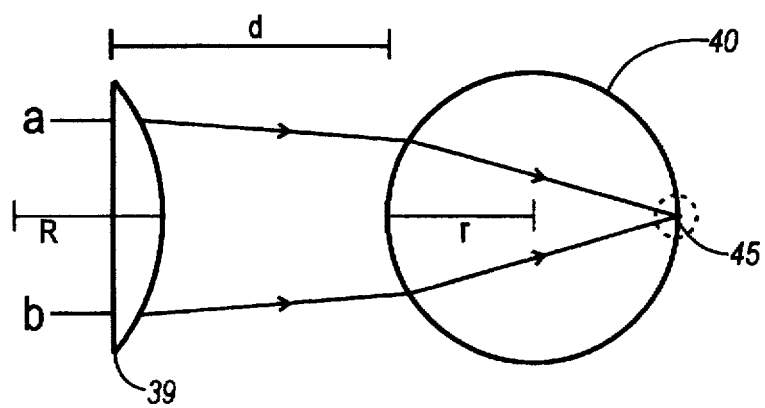
FIG. 4B illustrates refraction of light by a spherical lens ball in a fluid in the presence of a converging lens.

FIGS. 3 and 4A–4B illustrate this principle. In each of these figures, parallel light from a collimated source (not shown), represented by light rays a and b, is incident on a transparent spherical ball 30 having a radius r. Following a treatment by Smith and Thompson (F. G. Smith and J. H. Thompson, Optics, London: John Wiley & Sons Ltd., 1971, p. 98), an equation can be written to describe the refraction of light by ball 30, as follows:

$$-n_1/L_1+n_2/L_2=(n_2-n_1)/r \qquad [1]$$

Here, $L_1$ is the object distance, $L_2$ is the image distance, ni is the refractive index of the medium outside the ball, and $n_2$ is the refractive index of the ball material. Assuming that the medium outside ball 30 is air so that $n_1=1.0$, and further assuming that ball 30 is made from a glass with a refractive index $n_2$ of approximately 1.9, the above equation [1] can be reduced to:

$$1.9/L_2=0.9/r \qquad [2]$$

This follows from the fact that the incident light is parallel, so that $L_1$ can be treated as infinite. Solving yields approximately:

$$L_2=2.1r \qquad [3]$$

Equation [3] says that incident light from a large distance very nearly focuses to a spot on the wall of ball 30. This is illustrated in FIG. 3. The reflected portion of the incident light in FIG. 3 will nearly exactly retrace the path of the incoming light and will leave the ball as a parallel beam of light propagating in the direction back toward the light source. Under these conditions, ball 30 is a nearly perfect retro-reflector; this fact is widely taken advantage of in highway and road signs.

Thus, a transparent ball such as ball 30 is a lens-like structure. Such a spherical lens ball can be made to rotate upon application of an electric field if it is made electrically dipolar. In particular, if the ball's surface is coated asymmetrically with materials having different electrophoretic properties, it can acquire an electrical dipole moment in the presence of a dielectric fluid. However, the presence of the fluid affects the refractive properties of the spherical lens. For example, if the medium outside ball 30 is a dielectric material having a refractive index $n_1$ of approximately 1.4, then for parallel incident light, equation [1] becomes:

$$1.9/L_2=0.5/r \qquad [2']$$

or approximately:

$$L_2=3.8r \qquad [3']$$

Equation [3'] says that incident light from a large distance focuses at a point well behind the rear wall of ball 30. This is illustrated in FIG. 4A, in which ball 30 is disposed in a fluid-filled cavity 33 of an elastomer 32. The fluid (not shown) can be, for example, a plasticizing oil that swells elastomer 32 to create cavity 33. The elastomer 32 and the fluid are both assumed to have the same refractive index, typically about 1.4.

FIG. 4B shows a spherical lens ball 40 that is assumed to be immersed in a dielectric fluid (not shown) in an elastomer (also not shown). A converging lens, such as thin plano-convex lens 39, is situated between parallel incoming light (here represented by rays a and b) and ball 40. Lens 39 acts to focus the parallel beam of incoming light into a convergent beam. The beam is then further focused by ball 40, to a focal point 45 on the wall of ball 40 opposite the incoming light, as shown. To ensure that the light is properly focused, certain conditions must obtain for the radius of curvature R of lens 39 and also for the distance d that separates lens 39 and ball 40, d being measured from the nearest point on ball 40. Using equation [1] and setting $L_2=2r$ (for example), it follows that lens 39 must have a focal length $L_1=3.11r$, so that its focal point lies well behind ball 40. This condition is met if $$d=3.8R-3.11r \quad [4]$$

Equation [4] is satisfied in the illustration of FIG. 4B. Note that placing lens 39 still further away from ball 40 (that is, increasing the distance d) causes the incoming light to be focused on the near wall of the ball; this alternative arrangement can be useful in some instances.

In sum, light rays passing through a spherical lens ball focus at a point determined by the refractive index of the ball and also the refractive index of the surrounding medium. For a gyricon display, the surrounding medium is typically a dielectric liquid. The balls have a high refractive index and the liquid has a low refractive index. Even so, to obtain the sharpest focus possible, just at the surface of the ball, an external focusing array or other auxiliary optics are needed.

Optically Dipolar Spherical Lenses

Figure 5A:
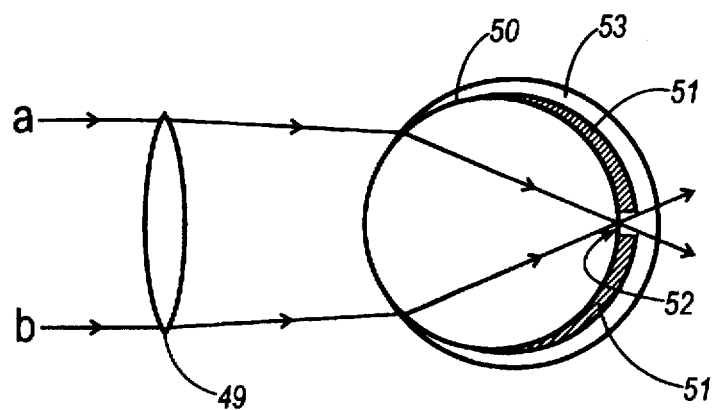
FIGS. 5A–5B show enlarged side views of a single spherical-lens ball with an aperture mask, in two different rotational orientations with respect to an incoming light flux.
Figure 5B:
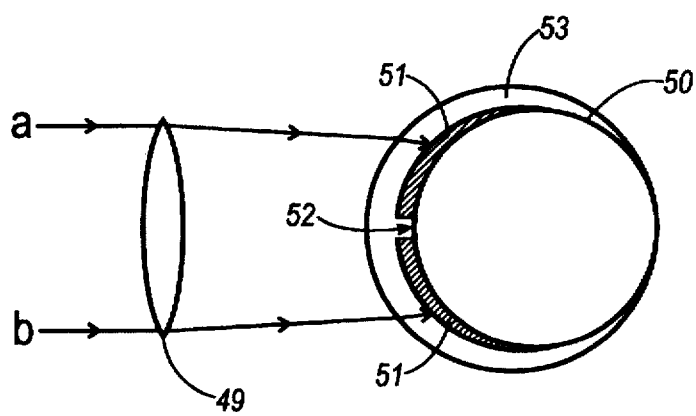
Figure 6:
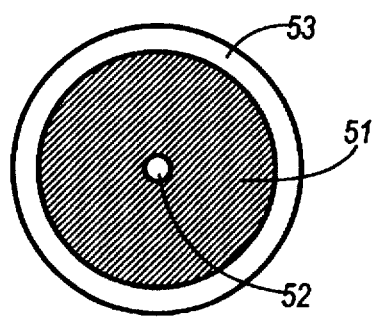
FIG. 6 shows an enlarged end view of a single spherical lens ball with an aperture mask.
Figure 7A:
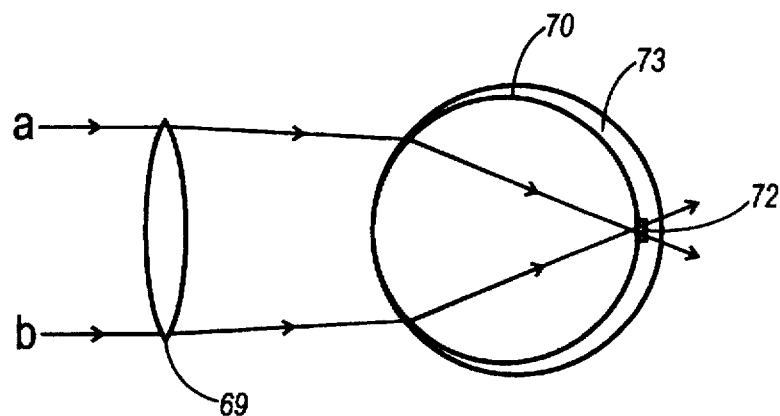
FIGS. 7A–7B show enlarged side views of a single spherical lens ball with an aperture stop, in two different rotational orientations with respect to an incoming light flux.
Figure 7B:
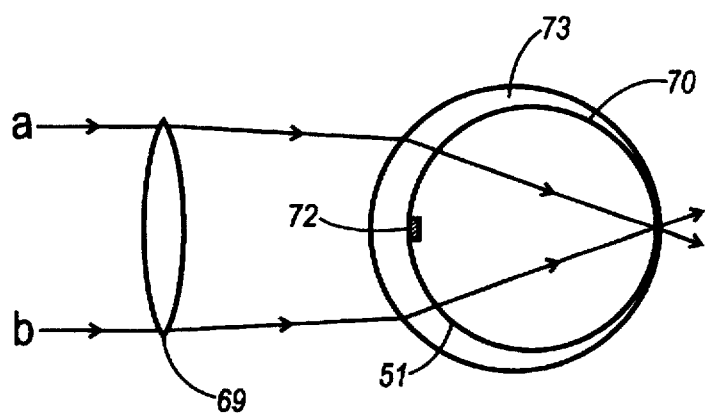
Figure 8:
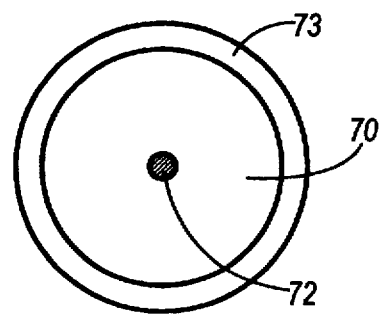
FIG. 8 shows an enlarged end view of a single spherical lens ball with an aperture stop.

According to the invention, a spherical lens ball can be made to be optically and electrically dipolar, and a gyricon display can be constructed from an array of such dipolar balls. Two ways of making dipolar spherical lens balls will now be described: aperture masks and aperture stops. Aperture masks are illustrated in FIGS. 5A-5B and FIG. 6. Aperture stops are illustrated in FIGS. 7A-7B and FIG. 8.

In FIGS. 5A-5B and FIG. 6, ball 50 is a transparent sphere partially covered by a hemispherical or partially hemispherical coating 51 having a central pinhole aperture or pupil 52. Ball 50 can be part of a gyricon display, and is shown in FIGS. 5A-5B and FIG. 6 as being disposed in a fluid-filled cavity 53. FIGS. 5A-5B show enlarged side views of ball 50, and FIG. 6 shows an enlarged end view of the coated portion of ball 50.

Also in FIGS. 5A-5B is a converging lens 49 that focuses incoming parallel light from a collimated light source (not shown), as represented by light rays a and b, in such a way that if ball 50 is oriented as shown in FIG. 5A, light rays passing through ball 50 focus at the back of ball 50 and thus at aperture 52. Lens 49 is needed because the refractive indices of ball 50 and the fluid that fills cavity 53 are such that, based on the refraction equations given above, the incoming light would otherwise be directed at a focal point behind ball 50 and so would not focus properly at aperture 52. Lens 49 can be part of an array of lenses that serves as the auxiliary optics for a gyricon display containing an array of spherical lens balls with aperture masks, including ball 50.

Coating 51, with its central aperture 52, can function as an aperture mask. For example, if coating 51 is opaque, then when ball 50 is in the illustrated orientation of FIG. 5A with respect to the incoming light, the incoming light can pass through ball 50 via aperture 52. However, when ball 50 is rotated 180 degrees so as to be in the opposite orientation with respect to the incoming light, as shown in FIG. 5B, almost all of the incoming light encounters the opaque mask. Only a very small amount of light passes through aperture 52, and the rest of the light is, for example, absorbed or reflected, depending on the material used to make coating 51.

As another example, if coating 51 is a transparent color, then when ball 50 is in the illustrated orientation of FIG. 5A with respect to the incoming light, the incoming light can pass through ball 50 via aperture 52. However, when ball 50 is rotated 180 degrees so as to be in the opposite orientation with respect to the incoming light, as shown in FIG. 5B, almost all of the incoming light encounters the transparent color mask. Only a very small amount of light passes through aperture 52, and the rest of the light is, for example, color filtered, depending on the material used to make coating 51. Thus, for example, if white light illuminates ball 50 and coating 51 is a transparent red color, the transmitted light emerging from ball 50 can be either white (if ball 50 is oriented as in FIG. 5A) or red (if ball 50 is oriented as in FIG. 5B).

In FIGS. 7A-7B and FIG. 8, ball 70 is a transparent sphere having a color dot 72 on its surface. Ball 70 can be part of a gyricon display, and is shown in 7A-7B and FIG. 8 as being disposed in a fluid-filled cavity 73. FIGS. 7A-7B show enlarged side views of ball 70, and FIG. 8 shows an enlarged end view of the portion of ball 70 that has dot 72.

Also in FIG. 7 is a converging lens 69 that focuses incoming parallel light from a collimated light source (not shown), as represented by light rays a and b, in such a way that if ball 70 is oriented as shown in FIG. 7, light rays passing through ball 70 focus at the back of ball 70 and thus at dot 72. Lens 69 is needed because the refractive indices of ball 70 and the fluid that fills cavity 73 are such that, based on the refraction equations given above, the incoming light would otherwise be directed at a focal point behind ball 70 and so would not focus properly at dot 72. Lens 69 can be part of an array of lenses that serves as the auxiliary optics for a gyricon display containing an array of spherical lens balls with aperture masks, including ball 70.

Surface dot 72 can function as an aperture stop. For example, if dot 72 is opaque, then when ball 70 is in the illustrated orientation of FIG. 7 with respect to the incoming light, the incoming light is focused at dot 72 and so is blocked from passage through ball 70. The light that strikes dot 72 can be, for example, absorbed by dot 72 or retro-reflected back to the source, depending on the material used to make dot 72. However, when ball 70 is rotated 180 degrees so as to be in the opposite orientation with respect to the incoming light, as shown in FIG. 7B, almost all of the incoming light passes through ball 70, and only a very small amount of light is blocked by dot 72.

As another example, if dot 72 is a transparent color, then when ball 70 is in the illustrated orientation of FIG. 7A with respect to the incoming light, the incoming light is focused at dot 72 and so is color filtered upon passage through ball 70. However, when ball 70 is rotated 180 degrees so as to be in the opposite orientation with respect to the incoming light, as shown in FIG. 7B, almost all of the incoming light passes through ball 70, and only a very small amount of light is filtered by dot 72. Thus, for example, if white light illuminates ball 70 and dot 72 is a transparent red color, the transmitted light emerging from ball 70 can be either red (if ball 70 is oriented as in FIG. 7A) or white (if ball 70 is oriented as in FIG. 7B).

Balls 50 and 70 can be, for example, glass microspheres having a refractive index of 1.91, such as are available from the Cataphote Division of Ferro Corporation (Cleveland, OH). Ball diameter is typically 10 microns. The fluid that fills the cavities surrounding the balls can be, for example, ISOPAR L, which has a refractive index of about 1.4.

Pinhole aperture 52 typically has a diameter on the order of 0.5 microns. Because of its small diameter, pinhole aperture 52 represents only a very small fraction (for example, about 0.25 percent if coating 51 is fully hemispherical) of the area of coating 51. Therefore, leakage of light through aperture 52 when ball 50 is in its light-blocking orientation is very slight, and does not significantly effect the high contrast ratios that can be achieved by the inventive display. Similarly, dot 72 typically has a diameter on the order of 0.5 microns and so represents only a very small fraction of the surface area of the ball 70 on which dot 72 is situated. Therefore, blockage of light by dot 72 when ball 70 is in its light-transmissive orientation is very slight, and does not significantly effect the high contrast ratios that can be achieved by the inventive display.

To make a gyricon display from balls such as ball 50 and ball 70, the balls must be made electrically dipolar, preferably with their electrical and optical dipole moments aligned. For ball 50, coating 51 serves to create the desired electrical dipole moment. Preferably, coating 51 is nonconductive and has significantly different electrophoretic behavior from the transparent material used to make ball 50. The difference in the electrophoretic behavior of the surface of ball 50 and the material of hemispherical coating 51 creates an electrical dipole moment in the presence of a dielectric fluid such as the working fluid that fills cavity 53 (e.g., due to difference in zeta potential in contact with the dielectric fluid). For ball 70, a transparent nonconductive coating (not shown in FIGS. 7A–7B and FIG. 8) can be applied to all or part of one hemispherical surface of ball 70, for example, to the surface of the hemisphere that contains dot 72. The transparent coating has a different electrophoretic behavior from the transparent material of ball 70 and this creates an electrical dipole moment in the presence of a dielectric fluid such as the working fluid that fills cavity 73.

With the balls thus made electrically dipolar, they can be made to rotate upon application of an electric field, so as to align their electrical dipole moments with the applied field, in a manner similar to that familiar from previous gyricon displays. Therefore, according to the invention, balls like ball 50 and ball 70 can be used in conjunction with converging lenses (like lenses 49 and 69) as imaging elements for gyricon displays. Examples of gyricon displays constructed from such optically dipolar spherical lens balls will be described below.

Fabrication of Aperture Masks and Aperture Stops

The nonconductive coating materials for coating 51 and for dot 72, as well as the transparent nonconductive coating for ball 70, can be applied to balls 50 and 70, respectively, by any of various techniques. Some exemplary fabrication techniques using a photoresist will now be described with reference to FIGS. 9–10.

Figure 9:
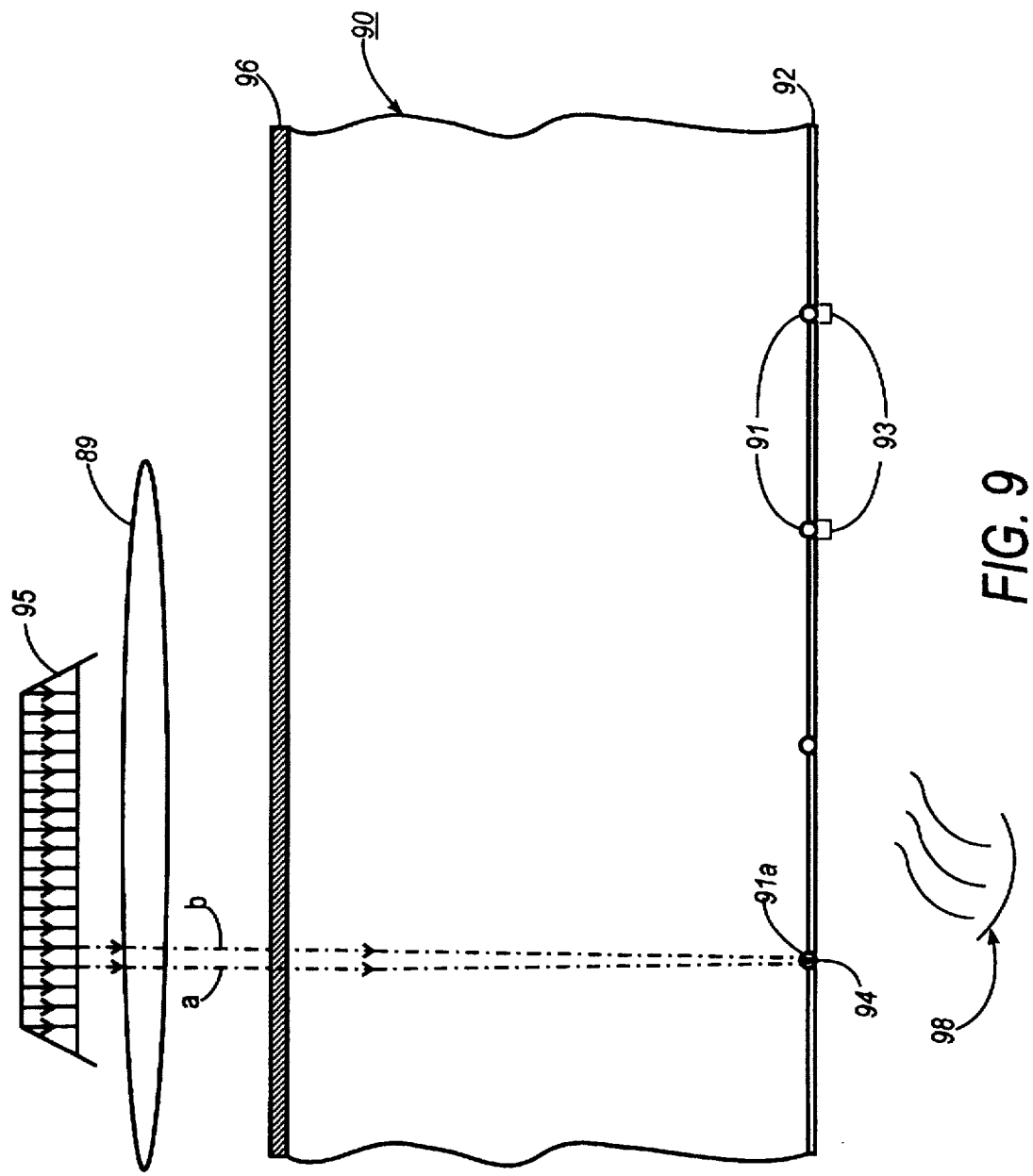
FIG. 9 shows a portion of a fabrication assembly for making aperture masks or aperture stops for spherical lens balls.

FIG. 9 shows a portion of a fabrication assembly for making aperture masks or aperture stops for spherical lens balls. Fabrication chamber 90 has a base plate 92 with holes 93, and also has a window 96 situated opposite from base plate 92. Plate 92 can be made of metal, for example, with holes 93 etched into the metal. Chamber 90 can be opened (not shown) to admit or remove transparent balls 91; for example, window 96 can be made so that it can swing or slide out of the way to permit access to the interior of chamber 90.

During fabrication, a monolayer of transparent balls 91 of uniform diameter is formed on plate 92, with one ball in each of holes 93 as shown. To form the monolayer, the balls 91 are put into chamber 90 on the surface of plate 92, and then plate 92 (or, alternatively, the entirety of chamber 90) is agitated so that the balls settle into the holes. Holes 93 are circular and are of a uniform diameter that is smaller than the uniform diameter of balls 91. Therefore, balls 91 can rest in holes 93 as shown, with partially hemispheric portions of their respective surface areas protruding into the holes 93. Chamber 90 is assumed to have side walls (not shown) and to be effectively sealed once the balls 91 have been placed in the holes 93.

After the monolayer of balls 91 is in place on plate 92, the balls 91 are partially coated with a photoresist. The photoresist can be applied to balls 91, for example, by way of a fine aerosol (e.g., a mist or spray) originating from a source 98 located outside chamber 90. The photoresist from source 98 coats the partial hemispheres of balls 91 that are exposed through holes 93, but does not enter the interior of chamber 90 and so does not coat the portions of balls 91 that face towards the inside of chamber 90. (In other words, the photoresist aerosol is applied only to the portions of balls 91 that protrude into holes 93.) Thus, partially hemispheric coatings are formed on balls in the vicinity of holes 93. The applied photoresist is then allowed to dry.

When making a photoresist aperture mask, the coatings formed on the balls in the vicinity of holes 93 preferably are made as close to fully hemispheric as possible, so as to maximize mask coverage area and minimize unwanted light leakage through the balls. Accordingly, holes 93 are made as large in diameter as is possible consistently with balls 91 not falling through the holes 93. That is, the diameter of holes 93 is just slightly less than that of balls 91, so that balls 91 protrude maximally through holes 93. (The same observation applies when making a photoresist aperture stop that is to be used as a negative for vapor deposition, as described below with reference to FIG. 10.)

After the photoresist is dry, a beam of light from a collimated source 95 is directed through window 96 towards balls 91. Preferably, the light from source 95 is light that is actinic for the photoresist; typically, ultraviolet light is used. Window 96 is of a material transparent to the actinic light; for example, if ultraviolet light is used, window 96 can be made of quartz.

The light beam, here represented by rays a and b, passes through window 96 and the air or vacuum surrounding balls 91 until it reaches the spherical surfaces of balls 91. There the light beam is refracted, as described earlier; in particular, equation [3] obtains, so that for each ball, the incoming light beam is focused at a single spot situated approximately at the back wall of the ball. For exemplary ball 91a, the light focuses approximately at spot 99. Optionally, and as shown, the focusing can be corrected by the use of a converging lens 89 that intercepts the incoming beam and changes it from a parallel beam to a suitably convergent one.

What happens next depends on whether a positive (photo-dissolving) or negative (photo-dissolve resistant) photoresist was used to coat the balls:

To form an aperture stop, a positive photoresist is used. Exposure of the positive photoresist to the focused beam of actinic light causes the exposed portion of the photoresist to harden. Thus only a single spot of photoresist hardens, and the rest does not. The single spot corresponds to the aperture stop.

To form an aperture mask, a negative photoresist is used. Exposure of a negative photoresist to the focused light beam causes the exposed portion to soften, while the unexposed portion of the photoresist remains hard. Thus a partially hemispherical mask is formed on the ball, with only a single spot left unhardened. The single spot corresponds to the pupil or pinhole aperture of the mask.

The photoresist, whether positive or negative, is preferably a high-$\gamma$, photoresist, so that its behavior in the presence of the strongly focused light converging at the focal point differs strongly from its behavior in the presence of unfocused or scattered light. Accordingly, the aperture stop or aperture mask (as the case may be) hardens much more rapidly than the rest of the photoresist.

after the photoresist has been exposed by the beam, a developer for the photoresist is applied to balls 91. For example, the developer can be sprayed on the balls through holes 93 from a source external to chamber 90 (similarly to the way that the photoresist aerosol was previously applied from source 98). The developer is typically a high-pH aqueous chemical solution, such as NaOH. The developer removes any non-hardened photoresist. Thus, for an aperture stop, the developer removes the photoresist except at the central spot, where the photoresist has hardened. For an aperture mask, the developer removes the photoresist only at the central spot, where the photoresist has not hardened. After development is complete, the balls are rinsed with water and removed from chamber 90.

At this point, a spherical lens ball with a photoresist aperture stop or aperture mask coating has been produced. The photoresist coating is likely to be transparent, as many of the photopolymers commonly used for photoresist are transparent materials. The aperture mask or stop can be made more suitable for use in a gyricon display by addition of a colorant, such as a dye, or a thin vapor deposition layer.

A dye can be added to the aperture mask or stop as a final step after the photoresist exposure and development described above is complete. The balls are removed from chamber 90 and are immersed in a dye whose composition is such that it is absorbed by the photoresist. For an aperture mask, the dye is typically opaque (e.g., light-absorbent or light-reflective). For an aperture stop, the dye can also be opaque (as for a monochrome display), or can be a transparent color (as for a color filter in the subtractive color display described below with reference to FIG. 18). Alternatively, if the dye's chemical composition is such that it will not interfere with the photoresist exposure and development process, the dye can be added to the photoresist ahead of time, before the photoresist is applied to balls 91.

Figure 10:
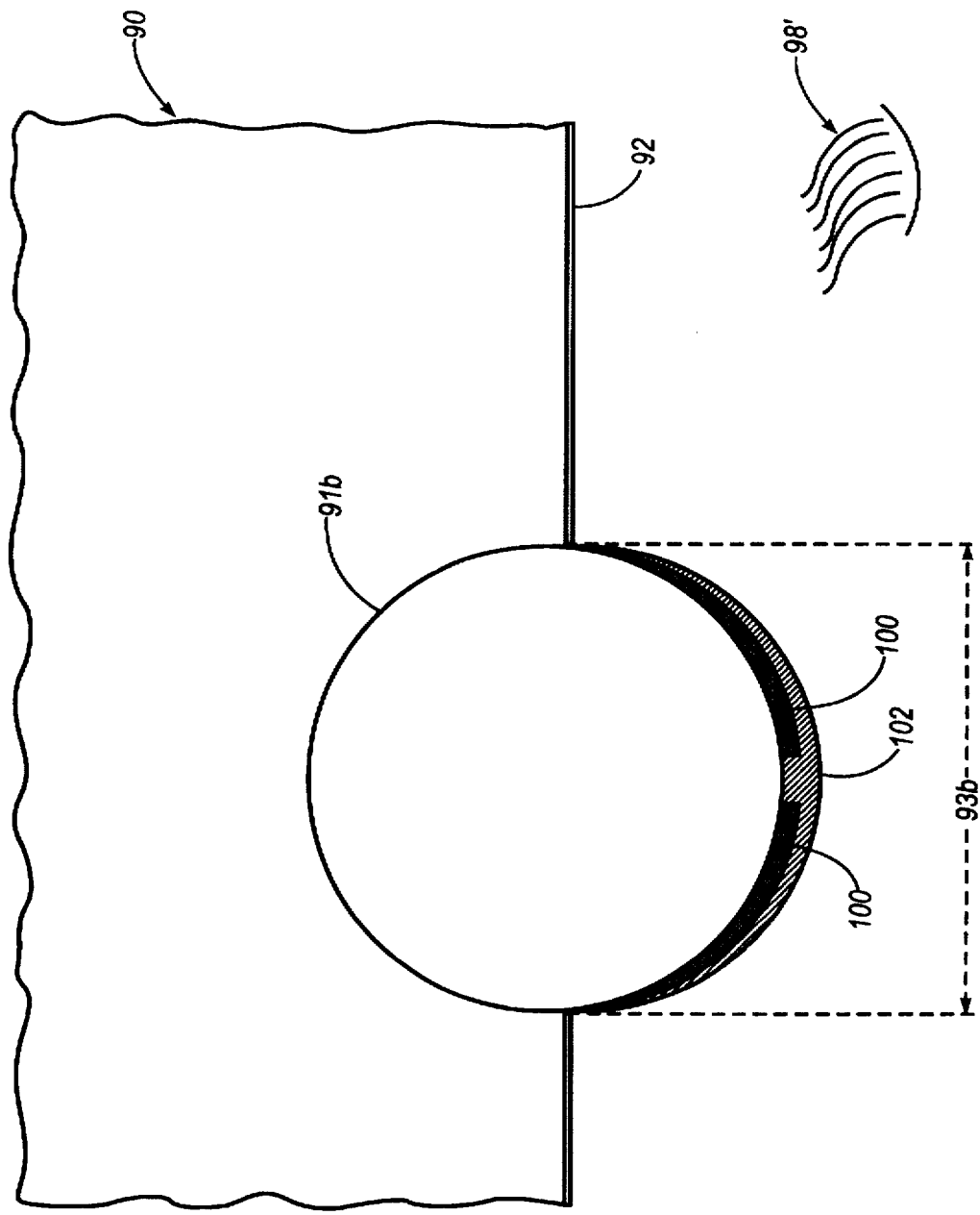
FIG. 10 illustrates a vapor-deposition (thin film) overcoat on a spherical lens ball.

A vapor-deposition film can be applied to balls 91 as a final step after the photoresist exposure and development described above is complete, to produce an opaque aperture mask or reflective aperture stop. While balls 91 remain in holes 93, a vapor is deposited on the balls 91 through holes 93 from a source external to chamber 90, in a manner similar to that previously used to apply the photoresist from source 98. A thin film of the vaporized material thus coats the partial hemispheres of balls 91 that are exposed through holes 93, but does not enter the interior of chamber 90 and so does not coat the portions of balls 91 that face towards the inside of chamber 90. The deposited thin film covers all of the hemispheres exposed through holes 93, including portions of balls 91 that were previously coated by photoresist. This is illustrated in the enlargement of FIG. 10 for an exemplary ball 91b, which has a photoresist coating 100 in the form of an aperture mask and a thin film 102 overcoating that. A portion of plate 92 through which ball 91b is exposed via hole 93b to vapor from a source 98' can also be seen. Source 98' and chamber 90 can be placed in a larger vacuum chamber (not shown) to facilitate the film deposition.

The material used to form film 102 can be, for example, an opaque nonconductive material formed by codepositing indium and magnesium fluoride. For an aperture stop, it can also be a metallic film, such as chrome. Use of a metallic film is not recommended for aperture masks, because the large conductive area provided by such a film can interfere with the formation of the ball's dipole moment, and thus with ball rotation.

Once film 102 is deposited over the photoresist, balls 91 are removed from chamber 90 and are immersed in a photoresist stripping solution. The stripping solution penetrates through tiny pores in film 102 and reaches the underlying photoresist, where it plasticizes and eventually dissolves the photoresist, rupturing the overlying film 102 in the process. This causes both the photoresist and the film to be carried away by the stripping solution. However, in regions not undercoated by photoresist, the film remains intact. Thus the photoresist coating on the ball effectively acts as a "negative" that is "developed" by the photoresist stripping solution into a thin-film "positive": specifically, a photoresist aperture mask coating (as depicted in FIG. 10) yields a spherical lens having a thin-film aperture stop, and a photoresist aperture stop yields a spherical lens having a thin-film aperture mask.

It remains to be said how to form the transparent nonconductive coating for an aperture stop spherical lens ball. Once again, chamber 90 can be used. The coating is applied after the monolayer of balls 91 is formed and in place on plate 92, but before the photoresist coating is applied from source 98. A suitable coating material, such as magnesium fluoride, is flash evaporated through the holes 93, causing the exposed portions of balls 91 to be coated therewith. Then the photoresist exposure and development steps can be performed as described above. In this case, the transparent coating of each ball is on the same side of the ball as its aperture stop.

Alternatively, the coating material can be flash evaporated within chamber 90 and thus applied to the hemispheres of balls 91 located opposite the aperture stops. In this case, the coating step can be performed at any convenient time while the balls remain in holes 93.

Auxiliary Optics

As described earlier with reference to FIGS. 4A–4B, a spherical lens ball of the invention cannot ordinarily achieve proper focus when immersed in the working fluid of a gyricon display, because of the relatively high index of refraction of the fluid as compared with that of the ball. Accordingly, auxiliary optics are needed to bring incoming light into proper focus on the wall of the spherical lens ball.

Figure 11B:
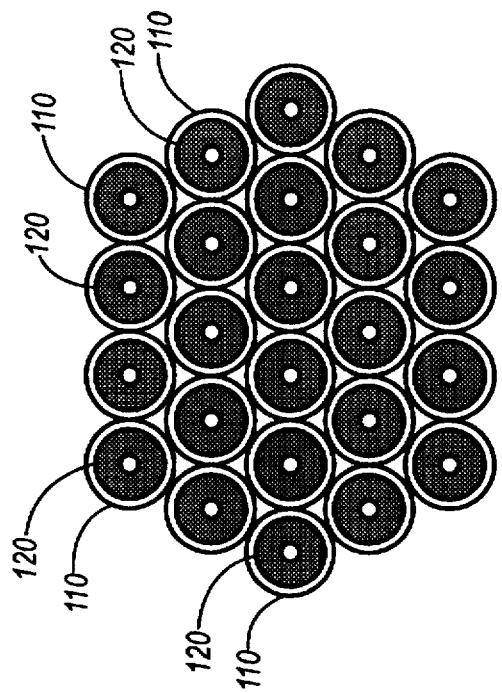
FIGS. 11A–11B illustrate "fly's-eye" lens arrays in side and overhead views, respectively.
Figure 11A:
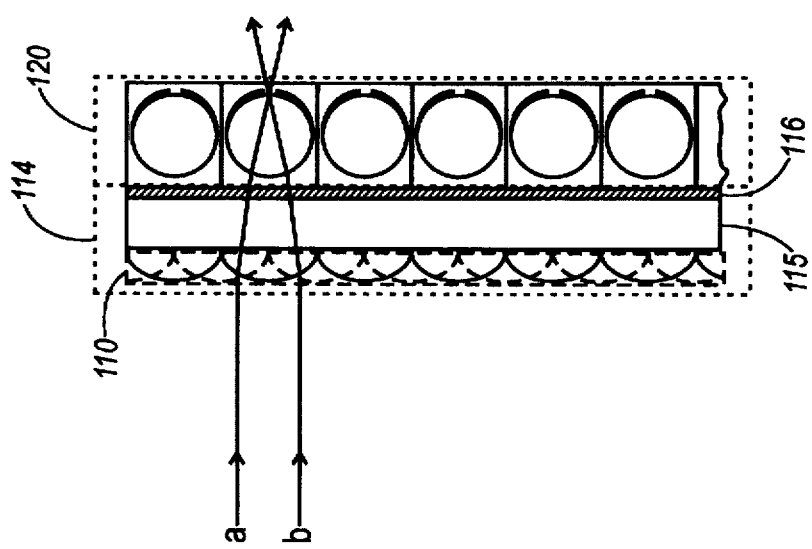

An array of converging lenses, one per spherical lens ball, is suitable for this purpose, as shown schematically in FIGS. 11A–11B. In each of these figures, a "fly's-eye" array 110 of plano-convex microlenses is positioned between an incoming light beam (represented by rays a and b) from a collimated light source (not shown) and an array of spherical lens balls 120. FIG. 11A shows a side view of array 110 and FIG. 11B an overhead view. As can be seen, each microlens of array 110 is preferably positioned coaxially with its corresponding spherical lens ball in array 120. For example, the central axes of exemplary microlenses 110a, 110b are aligned with the pupils in the aperture masks of balls 120a, 120b, respectively. Therefore, the lenses of array 110 serve to correct the focus of the incoming light beam so that the light rays converge properly at the aperture mask pupil or aperture stop (as the case may be) when the balls are appropriately oriented.

Fly's eye microlens arrays can be purchased commercially, for example, from United Technologies Adaptive Optics Associates, Inc., (Cambridge, MA). Typically, the arrays are precision molded (e.g., by injection molding) of transparent plastic. They can be made in any array geometry, for example a hexagonal geometry (as shown in FIG. 11B) or a rectangular geometry. Preferably, the geometry and inter-lens spacing are the same for both the fly's eye array and the spherical lens array, to ensure that proper registration (that is, mutual alignment) of the two arrays can be achieved. For this reason, the lens array itself is used to pattern the eggcrate structure that contains the spherical lens balls, as will be described below. The width of each microlens of the fly's-eye array (that is, the linear dimension of a chord formed by connecting the two vertices of the lens along the planar portion of the lens) is preferably the same as the diameter of the eggcrate cavity, so as to maximize light transmission efficiency from the lens into the spherical lens array.

Proper spacing between the fly's-eye array and the spherical lens array can be maintained by a transparent spacer situated between the two arrays. For example, in FIG. 11A, plano-convex lens array 110 is oriented with the convex sides of its microlens elements facing toward the incoming light, and transparent spacer 115 abuts the planar surface of array 110 that faces away from the incoming light. Spacer 115 is a transparent plate having the same refractive index as lens array 110, and has an ITO electrode coating 116 deposited on the side closest to the spherical lens elements. Spacer 115 can be affixed to lens array 110 by making a single one-piece structure (e.g., from injection- molded plastic) that incorporates both lens array 110 and spacer 115, or else by fabricating lens array 110 and spacer 115 separately and then bonding lens array 110 to spacer 115 with epoxy or other transparent bonding material. The thickness of spacer 115 is such that when the lens-array-and-spacer combination 114 abuts against the surface of spherical lens array 120, as shown, the correct optical relationships obtain. In particular, the microlenses in combination with the spherical lens balls causes light to focus at the ball walls.

"Eggcrate" Substrate

To ensure proper registration of the fly's-eye lens array and the spherical lens balls, a highly regular array geometry is preferred, so that all lenses of the fly's eye array can simultaneously be registered with all of the spherical lens balls (that is, so that proper alignment of one microlens with one ball does not result in misalignment of another microlens with another ball). An ordinary elastomer substrate as practiced in known gyricon displays can be used if special care is taken to ensure that the balls are of highly uniform diameter and are placed in a close-packed array in the elastomer. However, another kind of substrate is preferable in displays of the present invention. This new kind of substrate, here called an eggcrate substrate, has a regular array or pattern of hollow cells in it, and so resembles the interior of an egg carton or a honeycomb. The regular pattern of cells ensures regular placement and spacing of the spherical lens balls even if there are nonuniformities in ball diameter. In other words, the regularity of the geometrical structure of the eggcrate substrate does not depend on uniformity of ball diameter or on careful placement of the balls in the substrate.

Figure 12B:
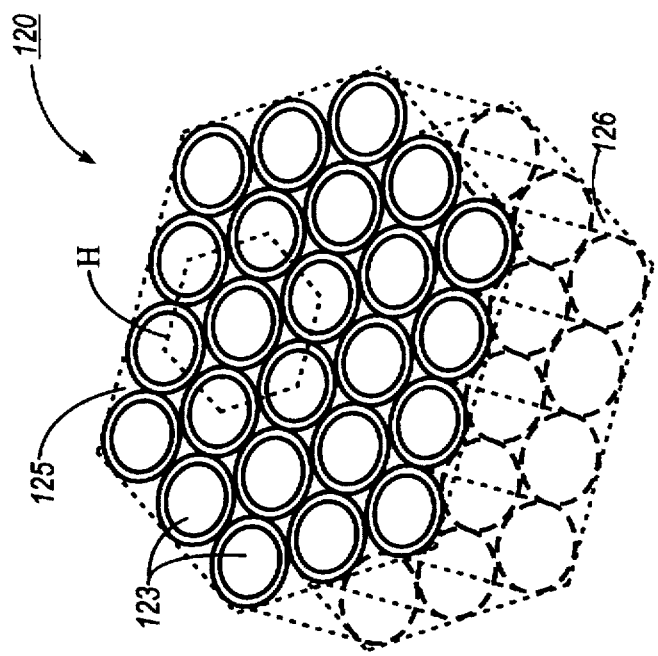
FIGS. 12A–12B show a portion of an empty "eggcrate" substrate in side and 3-D cutaway views, respectively.
Figure 12A:
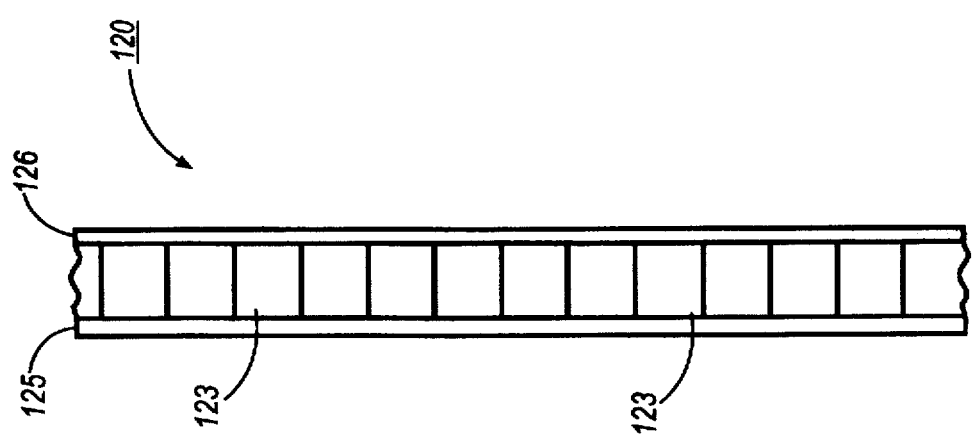
Figure 12C:
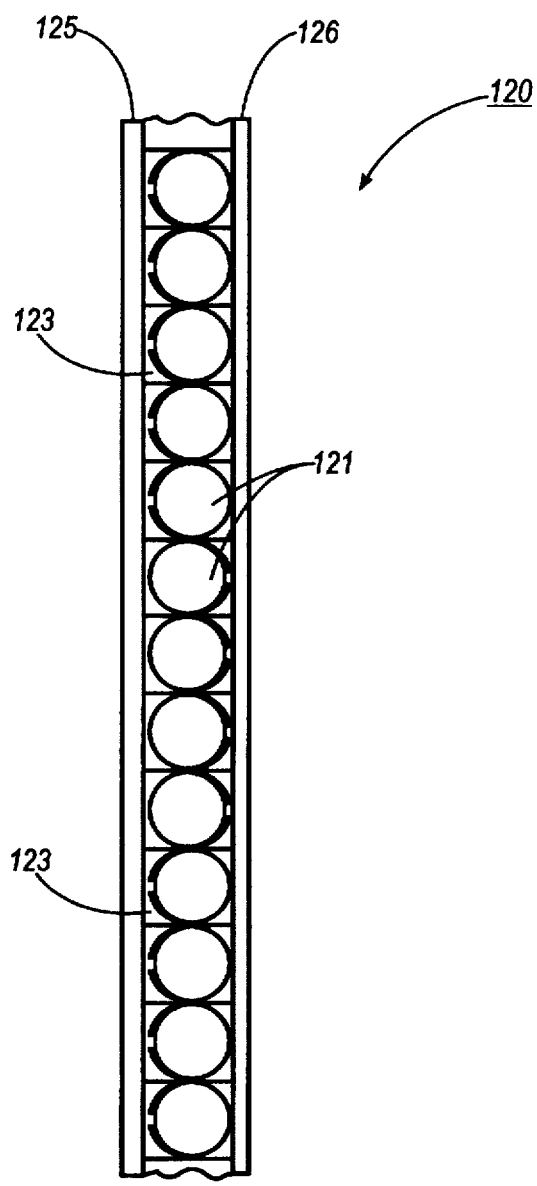
FIG. 12C shows how balls are placed in the eggcrate.

A portion of an empty eggcrate substrate 120 is illustrated in a side view in FIG. 12A, and in a three-dimensional cutaway view in FIG. 12B. Substrate 120 has transparent front and rear surfaces 125, 126 and contains a geometrically regular array of uniform cavities 123, which in this embodiment are cylindrical and are arranged in a monolayer in a closely packed hexagonal array geometry (as indicated by hexagon H). The cavity walls can be made opaque to reduce light leakage. Each cavity is filled with a transparent dielectric fluid (not shown), such as an oil, in this embodiment with an index of refraction closely matching that of the transparent material of substrate 120. In a working gyricon display, one ball is placed in each cavity of the eggcrate, as shown in FIG. 12C, where spherical lens balls 121 occupy cavities 123. Each ball 121 acquires an electrical dipole moment when immersed in the dielectric fluid that fills cavities 123.

The diameter of cavities 123 is slightly larger than that of balls 121, but preferably no larger than necessary to ensure proper rotation of balls 121 upon application of an electric field. Similarly, the depth of cavities 123 is only slightly larger than the diameter of balls 121, so as to minimize translation of the balls within the cavities and thus to maintain the balls at the proper focusing distance with respect to the lens elements of the fly's-eye array.

It is desirable to pack balls 121 as closely together in the gyricon display as possible, preferably in a monolayer. The close-packed monolayer arrangement maximizes the efficiency of light transmission by the inventive gyricon display. A hexagonal packing geometry maximizes the density of imaging elements, although a rectangular or rhomboidal geometry can also be used. Making the walls of cavities 123 as thin as is consistent with structural integrity tends to maximize the ball packing density for any given geometry.

Fabrication of "Eggcrate" Substrate

Unlike the substrates of known gyricon displays, the eggcrate substrate of the invention is not made from an elastomer sheet. Instead, it is precision-formed from the fly's-eye lens array in a manner that ensures it will closely match the geometry and spacing of the fly's-eye array, as will now be described.

Figure 13:
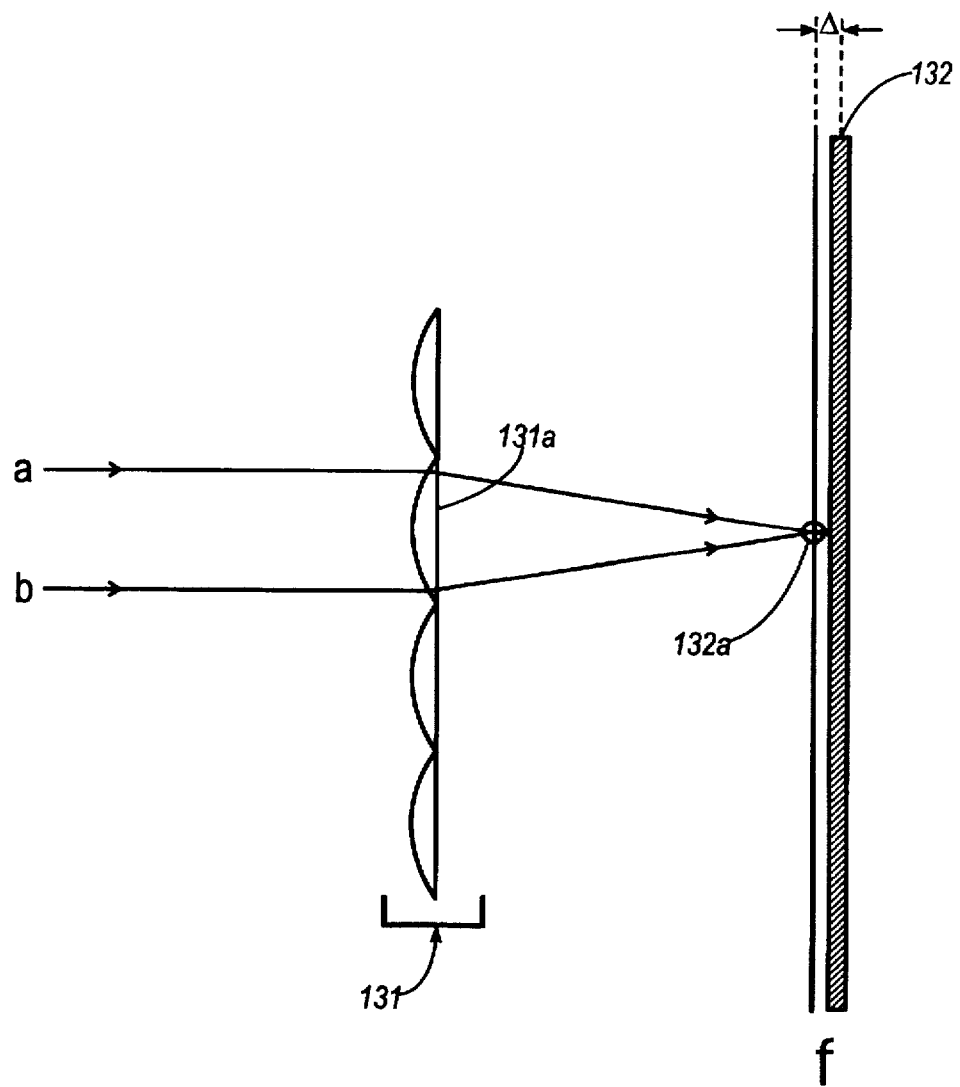
FIG. 13 schematically depicts a photomask used in fabricating an eggcrate substrate.

A photo mask that is an array of spots is produced by shining a beam of collimated light through the fly's-eye lens array onto a photo plate situated near the focal plane of the fly's-eye lens array. This is illustrated schematically in FIG. 13. A light source (not shown) produces a collimated light beam, here represented by rays a and b, that is directed towards fly's-eye array 131. The light beam encounters, and is focused by, the microlens elements of array 131. In particular, light incident on exemplary microlens element 131a of fly's-eye lens array 131 is focused thereby to a point 132a that is located in the focal plane f of element 131a and directly behind element 131a with respect to the incoming light beam. A flat, previously unexposed photographic plate 132 disposed parallel to and slightly in front of or behind the focal plane f is illuminated by the focused light from element 131a and exposed thereby, so that when plate 132 is photographically developed, a spot appears on the plate. A similar spot appears for each microlens of the array. The spot diameters depend on the distance Δ between focal plane f and the plane of plate 132. Plate 132, thus exposed and developed, becomes a mask for production of the eggcrate substrate.

Next, a glass plate coated with ITO is overcoated with a thin layer of a photopolymer such as, for example, RISTON photoresist (available from E. I. du Pont de Nemours and Co., Wilmington, DE). RISTON is a negative photoresist that comes from the manufacturer in the form of a polymer sheet, typically of 2 mils thickness. Under conditions of heat and pressure the RISTON sheet can be made to adhere to the glass plate. The desired thickness can be achieved by applying multiple layers in succession.

When RISTON is exposed to ultraviolet light, it photohardens, so that when subsequently placed in a high-pH aqueous development solution, only the unexposed portions are dissolved. Thus RISTON can be etched to form the cylindrical cavities of the eggcrate substrate. Specifically, the photomask with the array of spots that was formed from the fly's-eye lens array is placed in contact with the RISTON surface of the coated glass plate. The assembly is then exposed to highly collimated ultraviolet light from a photoresist exposure system. This light is unable to penetrate the dots on the photomask, but all other parts of the RISTON surface are exposed and thus photohardened. Thereafter, the photomask is removed and the RISTON-coated glass plate placed in the aqueous development solution. The areas of the RISTON that were underneath the photomask spots during the UV exposure are dissolved away by the developer, leaving holes that are nearly cylindrical. (In practice, the holes are slightly tapered such that the diameter of the hole adjacent to the glass plate is less than that at the air interface.)

Figure 14:
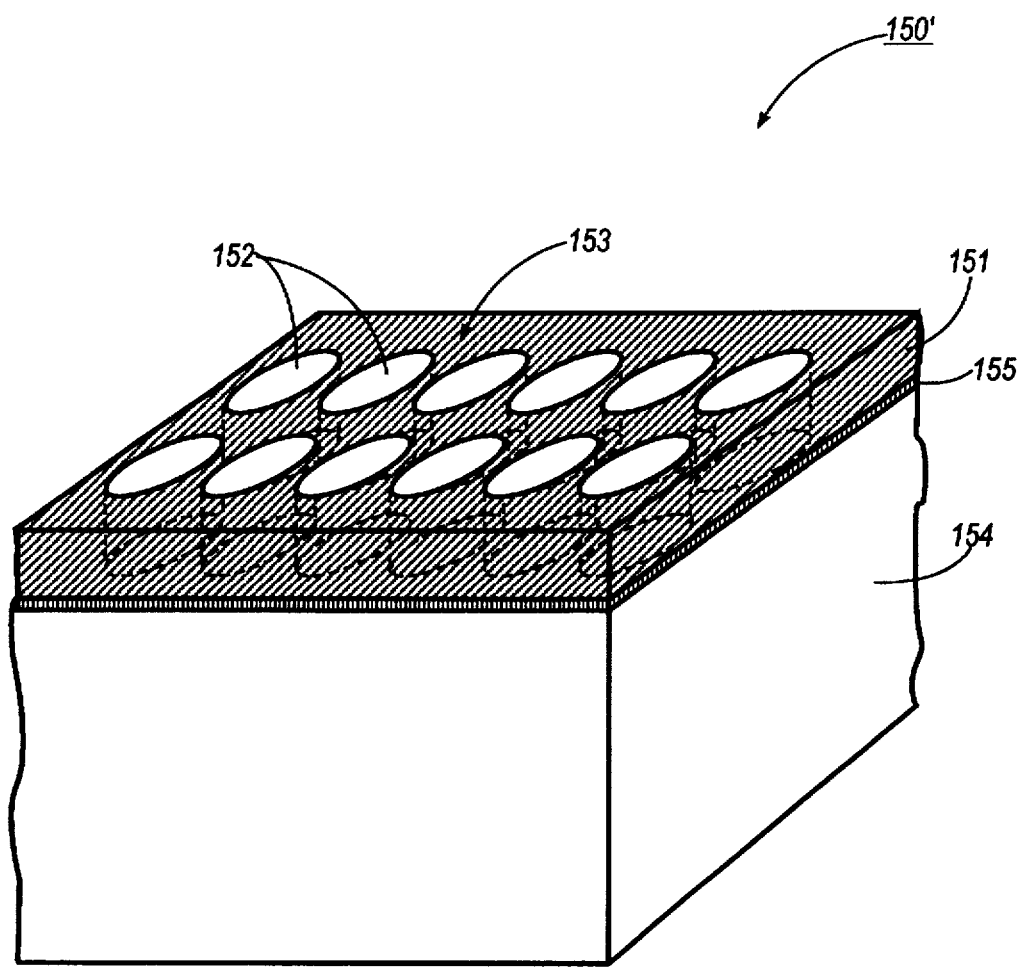
FIG. 14 shows a portion of a partially completed eggcrate substrate structure during fabrication.

A portion of the partially formed eggcrate structure 150' at this stage of fabrication is illustrated in FIG. 14. RISTON layer 151 contain cavities 152, and is topped by a flat surface 153 formed by the unetched RISTON. Layer 151 is situated atop transparent plate 154 which is overcoated with ITO electrode 155 as shown. The thickness of layer 151 is typically 4 mils; the thickness of plate 154 is typically 30 to 40 mils.

An optional additional step at this point is to add an opaque dye to RISTON layer 151. This can be done, for example, by immersing partially formed eggcrate structure 150' in a suitable dye that is absorbed by the RISTON. Thereafter, excess dye is rinsed away.

Figure 15A:
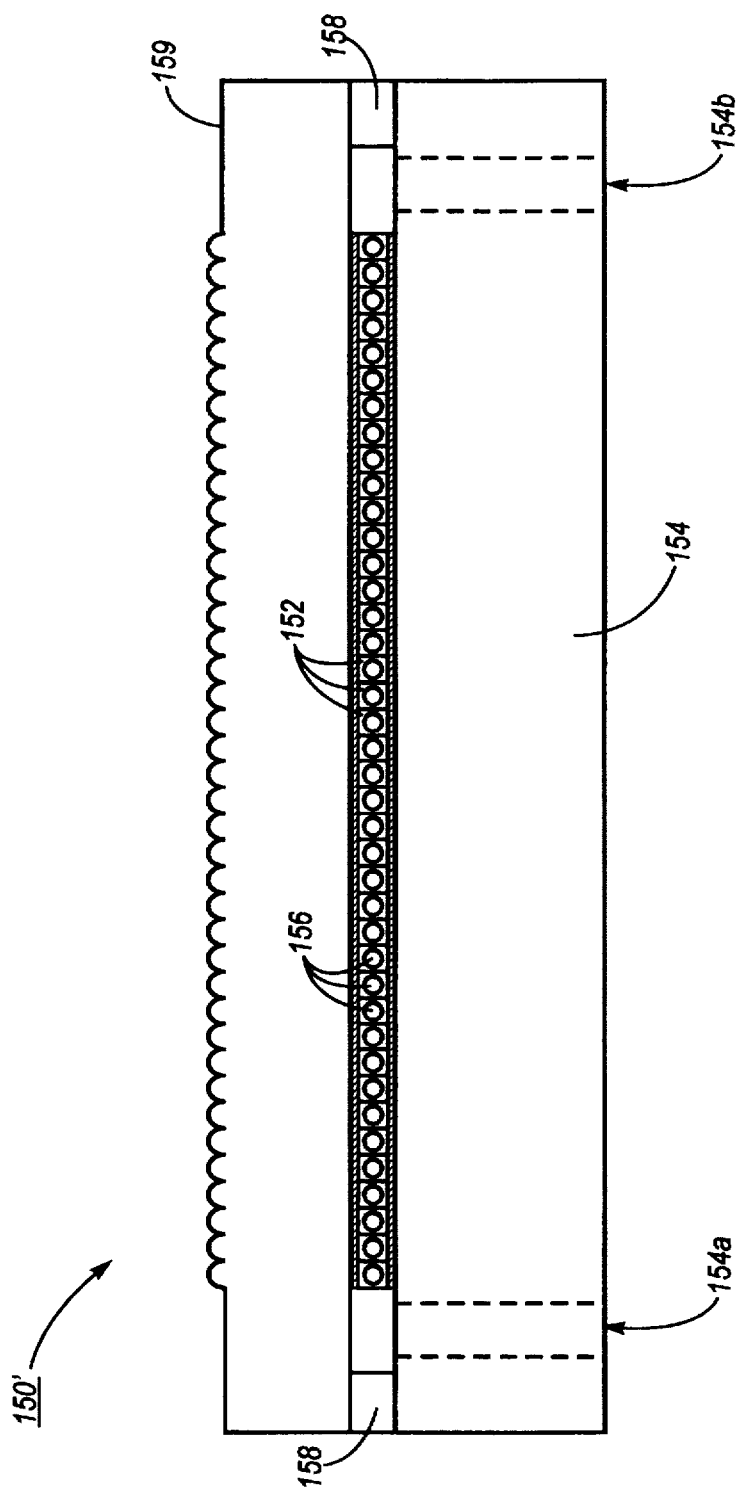
FIGS. 15A–15B show side and top views, respectively, of an eggcrate substrate in the final stages of fabrication.
Figure 15B:
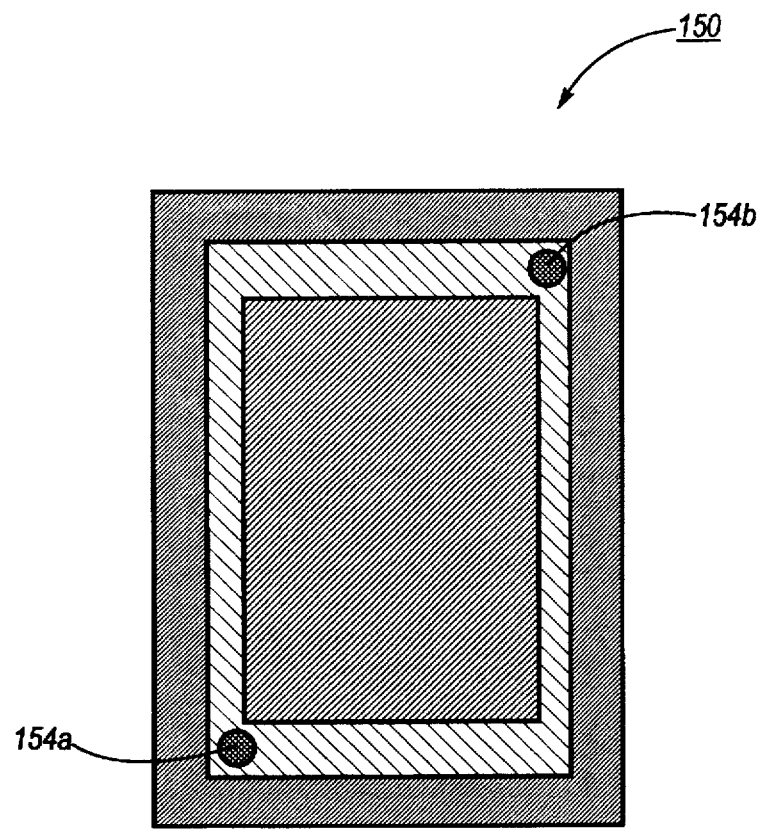

To complete the eggcrate structure, spherical lens balls are placed in the cavities, a top cover is added, and the structure is filled with dielectric fluid and sealed. This is illustrated in FIGS. 15A–15B. FIG. 15A shows a side view of the eggcrate structure 150 after the balls 156 are put in the cavities 152 and a top cover 159 has been added, but before the dielectric fluid is added. The top cover 159 in this embodiment is made up of a fly's-eye array together with a transparent spacer and its ITO coating, corresponding to the lens-array-and-spacer combination 114 previously described with reference to FIG. 11A. Top cover 159 is separated from plate 154 by a standoff 158, which can be formed of a thickened peripheral region of plate 154 as illustrated in the top view of FIG. 15B. Cover 159 is attached to standoff 158, for example, with a bonding material such as epoxy, to form an airtight seal. (Before top cover 159 is thus attached, its fly's-eye lens array is registered with the cavities 152 of eggcrate structure 150, as will be discussed in the next section below.)

The thickness of standoff 158 is preferably just slightly greater (e.g., 1 to 2 microns greater) than that of layer 151, so that a gap remains between surface 153 and top cover 159. This gap is too small for balls 156 to escape from cavities 152. The gap allows air that would otherwise be trapped in cavities 152 if cover 159 were flush with surface 153 to escape, and further allows dielectric fluid to enter cavities 152.

The eggcrate is now almost ready; all that remains is to add the dielectric fluid. To do this, a vacuum pump is attached to one of the ports 154a, 154b that are pre-drilled through plate 154, and a pump for the dielectric fluid is attached to the other port. Air is then evacuated from one end of the interior of the eggcrate structure while at the same time dielectric fluid is pumped in at the other end. Ports 154a, 154b are then sealed off, as by epoxy seals, thus completing the structure.

Other fabrication techniques can also be used to form the eggcrate substrate. For example, if it is desired to make the eggcrate substrate from epoxy rather than from RISTON, the foregoing etching process can be modified as follows: Instead of starting with a photomask having an array of spots, one uses the negative image, that is, an array of holes in an opaque coating on the photomask. Going through the RISTON etch process outlined above yields an array of cylinders protruding from the glass plate. Next, a second glass plate is coated with a layer of uncured epoxy, and the two plates are pressed together and held together until the epoxy hardens. Subsequently the plates are pulled apart, so that the RISTON cylinders remain fixed in the epoxy coating. Thereafter, the RISTON cylinders are removed with a solvent that does not attack the epoxy (for example, acetone). The result is an epoxy eggcrate structure.

Yet another possibility for fabrication is to form the eggcrate cavity structure from RISTON as described above, and then to cast a layer of moldable, high tear-strength rubber, such as Dow Corning SILASTIC T-2 on top of this, using a vacuum to remove air from the cylindrical cavities and thus causing the uncured rubber to flow into the cylindrical cavities. Upon curing, the rubber mold is separable from the RISTON master, due to the taper of the cylindrical holes. The rubber is then used as a low-cost mold in lieu of the RISTON master. For example, the rubber structure can be pressed into an epoxy-coated surface and removed upon curing of the epoxy, leaving the lower portion of the eggcrate structure thereafter.

Still another possibility, also of low cost, is to form eggcrate cavities from plastic using injection molding techniques. For example, a negative of the RISTON eggcrate structure can be made using a negative of the photomask, in which the spots are transparent and the rest of the mask is opaque. The negative RISTON eggcrate is coated with a high-quality ceramic slurry which is subsequently hardened, as by air drying. This structure is heated to a high temperature, causing the RISTON to burn out. Liquid metal, such as stainless steel, is next forced into the ceramic structure, where it solidifies. The ceramic, being quite friable, is then easily removed by fracturing. The result is a structure suitable for plastic injection molding. Other methods of arriving at an injection mold structure for the eggcrate can also be used.

Whatever fabrication technique is used, in order to ensure optimal registration of the eggcrate with the fly's-eye lens array it is important that the eggcrate's structure be patterned directly from that of the fly's-eye lens array. This automatically compensates for small deviations from perfect uniformity of inter-lens spacing in the fly's-eye array, which otherwise could cause serious periodic misalignment of the fly's-eye microlenses with respect to the spherical lens balls.

Registration of Fly's-Eye Lens Arrays with Eggcrate Substrate

In forming eggcrate structure 150, the fly's-eye lens array of top cover 159 must be registered with the partially formed eggcrate structure 150', so that the fly's-eye lens array elements properly align with the cavities 152 and thus with the spherical lens elements. Such registration is possible because the eggcrate structure is formed from a photomask produced from the fly's-eye lens array itself, as has been described.

Registration can conveniently be performed just before balls 156 are added to cavities 152. For example, an optical alignment technique can be used. Top cover is placed parallel to and in rough alignment with partially formed eggcrate structure 150'. A light beam illuminates top cover 159 and the relative positions of top cover 159 and partially formed structure 150' are adjusted until light transmission therethrough is maximized. Once registered, top cover is moved away from partial structure 150' along a precise line perpendicular to the plane of partial structure 150'. This allows balls 156 to be added to cavities 152. Later, prior to bonding of cover 159 to standoff 158, top cover is moved back towards partial structure 150', again along a precise perpendicular so that registration is not disturbed.

If fly's-eye array is made in a separate piece from the rest of the top cover 159, rather than as an integrated single-piece unit, then the registration step can be postponed until the eggcrate 150 is filled with the dielectric fluid and sealed. In this case, prior to registration the balls 156 in cavities 152 should be oriented by application of an electric field so as to maximize light transmission. This can be done because the cavities 152 are already fluid-filled at this point, thus rendering balls 156 electrically dipolar.

Transmissive Gyricon Displays Based on Rotatable Lenses

The steps for fabricating the inventive gyricon display can now be briefly summarized. Spherical lens balls of the desired type (e.g., aperture mask balls or aperture stop balls) are fabricated as described earlier. A fly's-eye lens array is used to fabricate a matching eggcrate structure with transparent ITO electrodes, as has also been described. The balls are placed in the eggcrate structure prior to filling the display with dielectric fluid and sealing it, and at an appropriate stage the fly's-eye array is registered with the eggcrate cavities and the balls. Preferably, a protective housing is placed around the completed display. The display can then be used.

An exemplary arrangement for using the inventive display device in a projection system is shown in FIG. 16. A transmissive gyricon display device 160 of the invention is illuminated by light from a white light source L collimated by lens 169. A projection lens 165 projects the resulting image onto screen 167. Gyricon device 160 can be addressed, for example, with an pixel-addressable active matrix addressing circuit. As in known gyricon displays, typically many balls (e.g., nine or more) are used per pixel. Typically, the spherical lens balls of device 160 respond quickly to the addressing logic so that video frame rates can be achieved.

For a simple monochrome display, display 160 can be made with spherical lens balls having opaque aperture masks. In this case, application of an electric field in one of the directions perpendicular to the plane of the eggcrate substrate causes the balls in the vicinity of the applied field to rotate so that their aperture masks face towards the light source L, thus blocking the light and producing a black output. Application of an electric field in the opposite direction causes the balls to rotate 180 degrees so that their aperture masks face away from the light source L, so that light is transmitted through their pinhole apertures and a white output is produced.

In general, a gyricon display according to the invention can be made in various sizes and shapes, and using various materials for the gyricon balls, eggcrate substrate, and dielectric fluid. The inventive display also has other advantages inherent in gyricon displays. For example, they can be made thin and lightweight. They are optically bistable, in that an image, once displayed, is maintained even after the electric field is removed. Due to their bistability, the displays consume power only when a pixel changes state, so that the displays can operate at low power.

As will be shown, color displays can also be built according to the invention. Many different dyes can be suitable for use as coloring agents to provide chromatic and achromatic colors in aperture masks and stops of spherical lens balls, depending on the application and on the material or materials used in constructing the balls. ("Achromatic colors" is used hereinbelow to refer to colors essentially lacking in chroma, that is, to black, white, gray, and clear, and "chromatic colors" is used hereinbelow to refer to other colors, including red, orange, yellow, green, blue, indigo, violet, cyan, magenta, pink, brown, beige, etc.) By way of example, any given aperture stop or mask can be: black; white; clear (that is, essentially transparent and without chroma, like water or ordinary window glass); a transparent color (e.g., transparent red, blue, or green, as for RGB additive color displays; transparent cyan, magenta, or yellow, as for CMY subtractive color displays); and so forth.

Additive Color (RGB) Rotatable Lens Display

The display 160 of FIG. 16 can be modified as follows to produce an additive color red-green-blue (RGB) display: Three different colors of spherical lens balls-that is, spherical lens balls with transmissive color-filter aperture masks or stops in red, green, and blue-are arranged within the display's eggcrate in a pixel pattern. Each pixel is made up of three subpixels of red, green, and blue, each subpixel being addressable independently of the others. (That is, the spherical lens balls of one color can be rotated without affecting balls of the other two colors.) Preferably, there are many balls (e.g., nine or more) per subpixel.

Figure 17A:
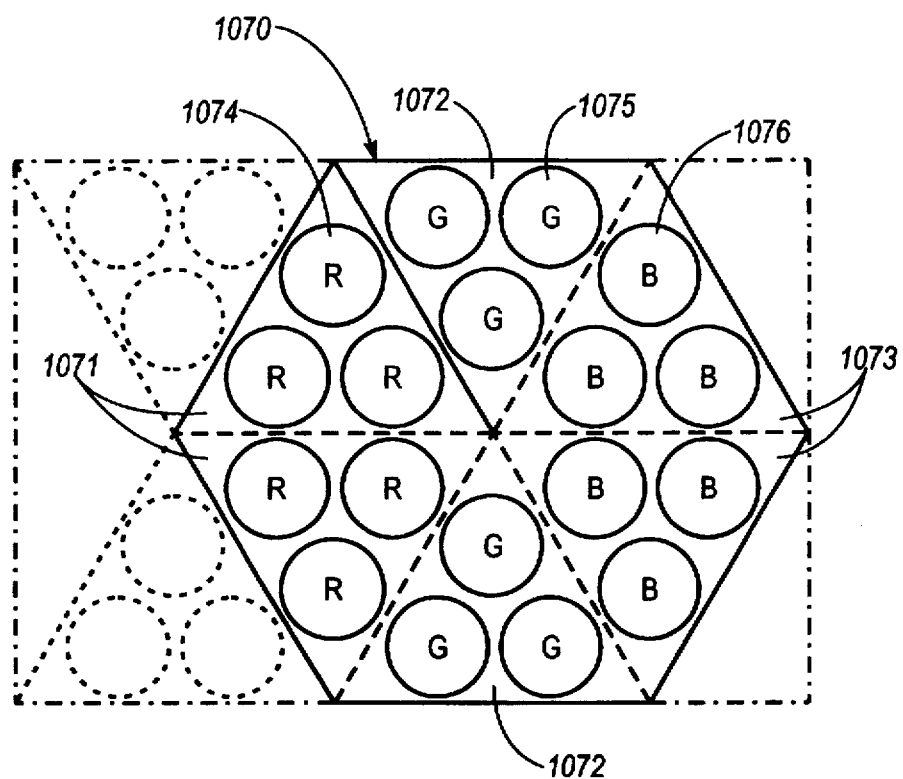
FIG. 17A schematically depicts an arrangement of red, green, and blue spherical lens balls in a subpixel pattern.

A subpixel pattern is shown schematically in FIG. 17A. A top view of an enlarged portion of eggcrate substrate 1010 is shown. Spherical lens balls of each color (RGB) are localized together in subpixels within eggcrate substrate 1010. Pixel 1070 includes red subpixel 1071, green subpixel 1072, and blue subpixel 1073. Each subpixel contains gyricon balls 1074, 1075, 1076 of its respective color only; for example, all the gyricon balls 1074 in red subpixel 1071 are red. The arrangement of the subpixels within each pixel can vary in different embodiments; for example, as shown in FIG. 17A, the subpixels can be arranged so as to form a hexagonal tiling pattern.

Each subpixel can vary between color and white or between color and black. To achieve color-to-white variation, for example, a clear (i.e., colorless) spherical lens ball having a transparent color filter aperture stop can be used. When the ball is oriented with its aperture stop away from incoming white light, light is focused through the aperture stop and color-filtered thereby, so that the emerging light is the color of the aperture stop (that is, red, green, or blue). When the ball is oriented with its aperture stop towards the incoming light, essentially all the incoming light is transmitted by the clear ball, so that the emerging light is white. To achieve color-to-black variation, for example, a spherical lens ball made of transparently colored glass and having an opaque aperture mask can be used. When the ball is oriented with its aperture mask away from incoming white light, light is color-filtered as it passes through the ball and is focused through the pupil of the aperture mask, so that the emerging light is the color of the ball (that is, red, green, or blue). When the ball is oriented with its aperture mask towards the incoming light, essentially all the incoming light is blocked, so that little or no light emerges.

Fabrication Technique for Strategic Placement of Different Balls in "Eggcrate" Substrate The RGB gyricon display is constructed from three different kinds of spherical lens balls, namely, balls with red aperture stops or masks, balls with green aperture stops or masks, and balls with blue aperture stops or masks. These three different kinds of balls are placed in different subpixel regions in the eggcrate substrate. A red subpixel contains balls with red coloration only, and does not contain balls of the other two kinds. Similarly, a green subpixel contains balls with green coloration only, and a blue subpixel contains balls with blue coloration only. To build this gyricon display, then, requires a manufacturing technique for placing the different kinds of balls in their respective different locations in the eggcrate substrate, so that the desired geometric pattern of red, green, and blue subpixels (e.g., the pattern of FIG. 17A) is obtained.

A technique for placement of gyricon balls at specified positions within an eggcrate substrate will now be described. The technique can be used, in particular, to position red, green, and blue gyricon balls in any desired pattern of subpixels.

Figure 17B:
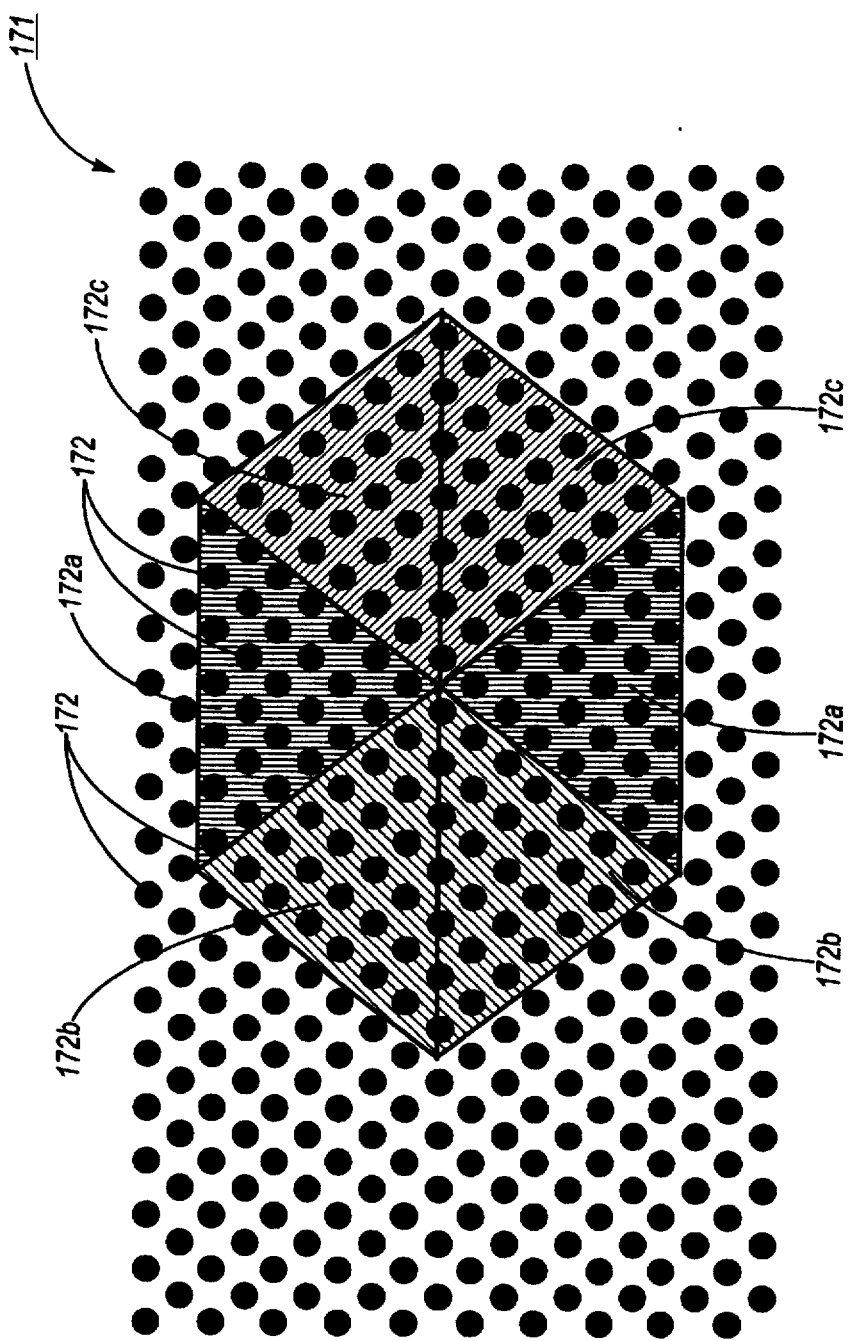
FIG. 17B shows a portion of a photomask used to fabricate an eggcrate substrate.
Figure 17C:
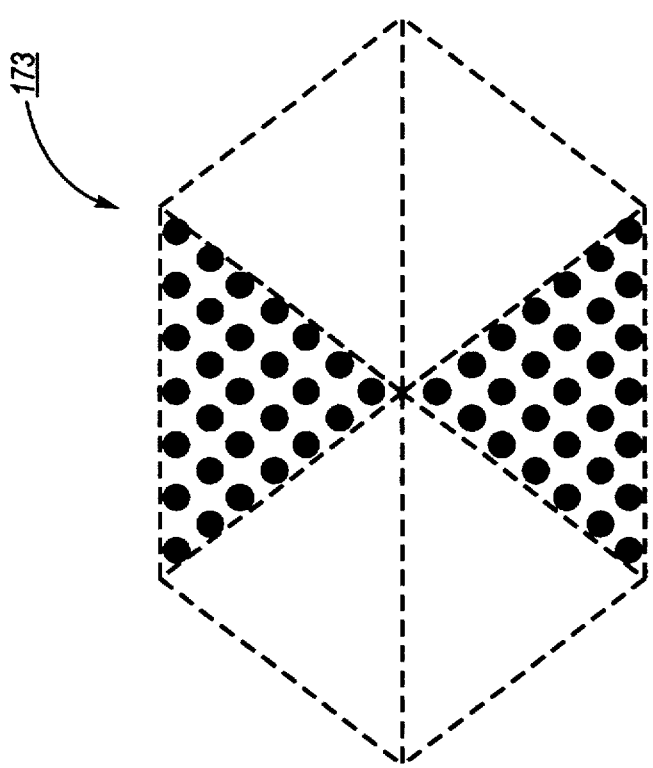
FIG. 17C shows a modified image of the mask of FIG. 17B.

Turning to FIG. 17B, a photomask 171 of the type used to create an eggcrate substrate is illustrated. This photomask can be digitized at high resolution and, through digital image processing, turned into three submasks. For example, spots 172 other than in vicinity 172a can be eliminated in the digital domain, producing the modified mask image 173 shown in FIG. 17C. This mask image can be used to generate a modified photomask. Similar processing can be done for spots in vicinities 172b and 172c, so that three modified photomasks are produced in all, one for each subpixel color.

Figure 17D:
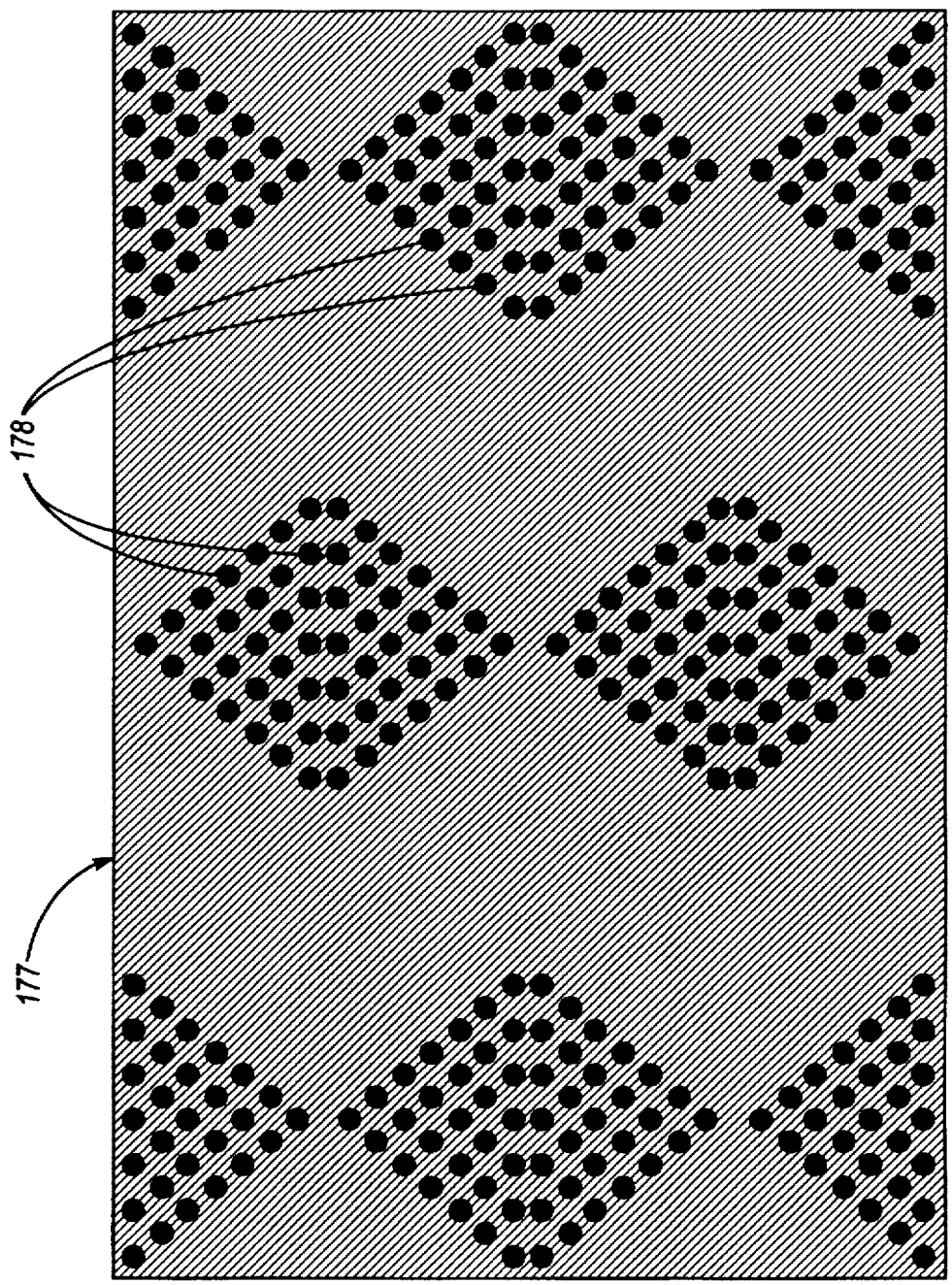
FIG. 17D illustrates a metal screen formed from the modified image of FIG. 17C.

A metal (e.g., nickel) screen is then formed from each of the modified photomasks. That is, there is one screen for each of the red, green, and blue subpixel patterns. An example of such a screen is shown in FIG. 17D. Screen 177 is thin and is solid except for holes 178 that correspond to the places in the eggcrate substrate where the balls for a subpixel color (e.g., red) are to be placed.

During fabrication of the eggcrate substrate, just prior to the placement of balls in the cavities, each of the metal screens in turn is aligned with and overlaid atop the open cylindrical cavities of the eggcrate. Then balls having the appropriate color (e.g., red) are deposited on the screen. The balls fall through the holes 178 into the cylindrical cavities of the eggcrate. To expedite this process, the screen can be gently vibrated. Each cavity of the eggcrate is sized to accommodate only one ball, so once a cavity is filled, no additional balls can enter it. Once all the cavities for that color subpixel pattern are filled, the process is repeated with the remaining screens for the other two colors.

Multilayer Subtractive Color (CMY/K) Rotatable Lens Display

A gyricon display with spherical lens imaging elements can also be used to provide a cyanmagenta-yellow (CMY) subtractive color image. In subtractive color imaging, unwanted color components are filtered out of incident light, typically by means of transparent color filters or dyes. Here, the gyricon balls, and more particularly their aperture masks or stops, act as color filters.

Figure 18:
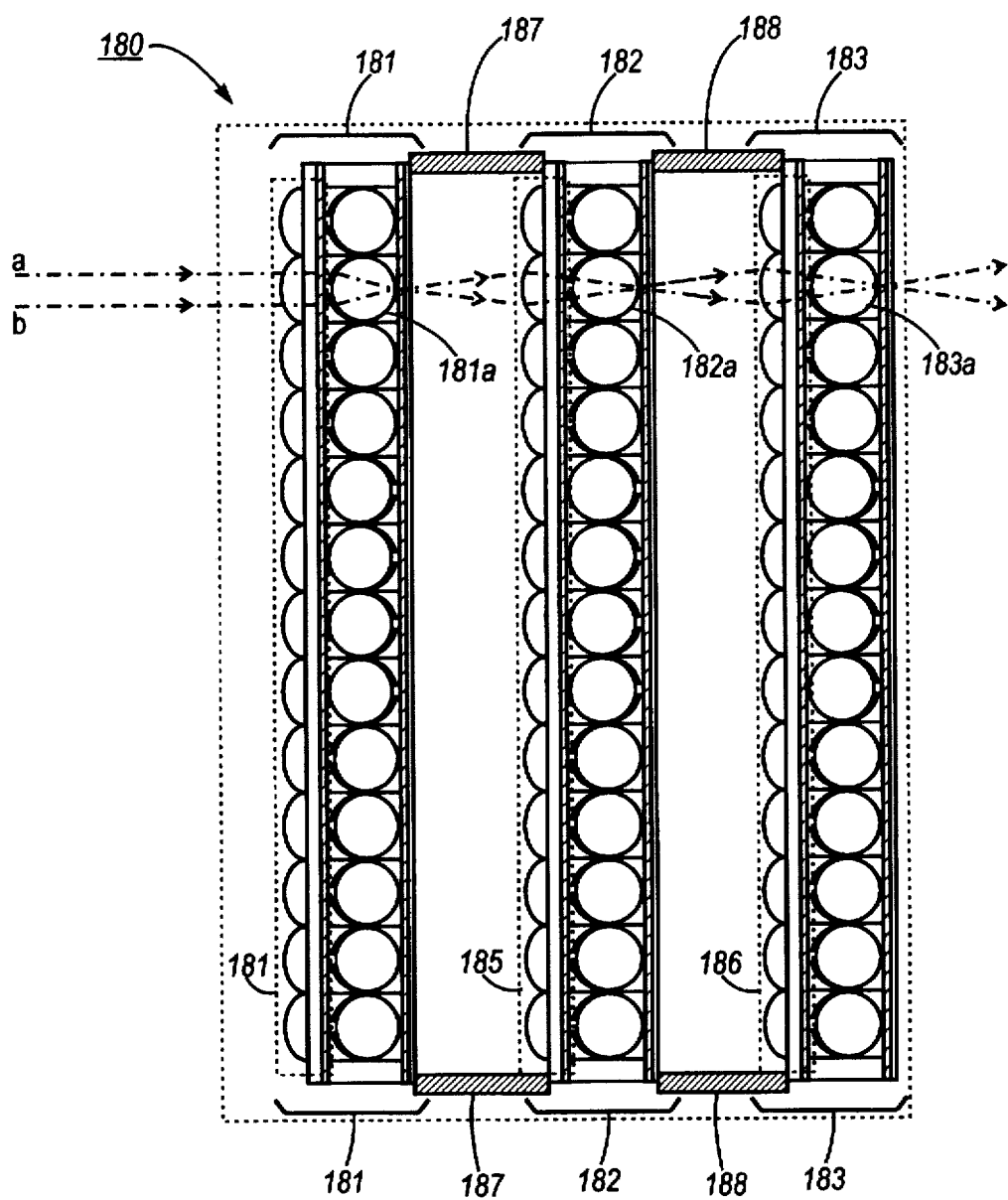
FIG. 18 is side view a CMY (cyan-magenta-yellow) subtractive color display, partially exploded to show its cyan, magenta, and yellow component units.

To make a subtractive color display, a stack of monochrome displays can be formed. This is shown in FIG. 18 for a CMY display 180. Each of the three component units 181, 182, 183 of the stack is a display like display 160 of FIG. 16. In particular, each unit has its own fly's-eye microlens array and its own addressing electrodes. Each unit can be addressed independently of the others. Component units 181, 182, 183 each contain color-filter spherical lens balls (either aperture stop or aperture mask type, as previously described) so that a given imaging element of any of the component units can be made to transmit either white light or a transparent color, depending on the ball orientation. For example, unit 181 can have cyan color filter spherical lens balls, unit 182 can have magenta color filter spherical lens balls, and unit 183 can have yellow color filter spherical lens balls. Optionally, an additional component unit containing opaque-mask spherical lens balls can be added to the stack (not shown) to provide a black component, thereby giving full CMYK color capability.

In display 180, alignment of component units 181, 182, 183 within the stack is crucial, because light emerging from one imaging element (such as exemplary element 181a) in unit 181 must thereafter pass through corresponding imaging elements in the remaining units 182, 183 (such as exemplary elements 182a, 183a, respectively). To achieve correct alignment, the fly's-eye arrays and eggcrate substrates used in the component units should have identical geometry and spacing. For example, arrays 184, 185, 186 can all be precision-formed from molds derived from the same pattern. Thereafter, registration of the component units with respect to each other can be achieved, for example, by optical alignment techniques. For example, with all spherical lens balls of units 181 and 182 in their fully transmissive orientation, the amount of light passing through the partial stack formed by these units, is maximized by holding unit 181 fixed and adjusting the position of unit 182. Thereafter, the process can be repeated for unit 183 and any additional units.

Although the spacing and geometry of the microlens elements in the fly's-eye arrays is the same for all units, the focal lengths of microlenses can differ from one component unit to the next. For example, and as shown in FIG. 18, the incoming light beam (here represented by rays a and b) is a collimated beam, whereas the light emerging from exemplary element 181a is divergent. The appropriate spacings and focal lengths will depend on the radius of curvature of the fly's-eye lens array and the indices of refraction of the materials used. Spacing between successive units can be maintained, for example, by standoffs such as standoffs 187, 188. Alternatively, additional, fly's-eye arrays (not shown) can be deployed between the units to turn the divergent beams into collimated beams. Like the units themselves, these extra arrays need to be carefully aligned to ensure proper light transmission from unit to unit.

Within a given unit, a group of one or more spherical lens balls can serve to provide a component color for color subtraction. Preferably, a large number of balls (for example, nine or more) located near one another are used for each component color in each pixel. Thus a pixel is made up of a column of three color regions situated above one another, one region from each of the three layers.

In contrast with the additive color display, there are no subpixels of different colors in the subtractive color display. Rather, the entire field of each pixel is filled with all the component colors, superposed on one another. This can improve the richness and accuracy of the resulting color image over what is obtainable with additive color techniques.

A subtractive color gyricon display of the invention need not be limited to cyan, magenta, and yellow component colors. Other colors can be substituted and additional layers carrying additional colors can be added. In particular, as mentioned above, black can be added. Also, a subtractive color gyricon display of the invention can be made with fewer than three component colors. For example, a two-layer stack can be made that includes a first layer of balls with opaque aperture masks (as in the CMYK display) and a second layer with aperture stops or masks of a transparent color. Such a display would be useful for providing a display of black plus a highlight color. Another possibility is a two-layer stack that has a first layer of a first transparent color and a second layer of its complementary (also transparent) color. For example, the first layer can be blue and the second one yellow. This display can produce each of its component colors plus black, which is produced by the subtraction of two complementary colors.

Gray Scale and Partial Color Saturation

The inventive displays described hitherto have been binary in each component color. For example, in a monochrome display, a single imaging element provides either white or black but not gray scale. Similarly, in a transmissive color display, a single imaging element provides either complete unfiltered light transmission or a fully saturated color or component color, but not partially saturated colors.

To obtain gray scale and partial color saturation with the inventive display, the following technique can be used: The display is operated at a characteristic scanning rate, for example, a video frame rate. Each pixel is readdressed (sub-scanned) several times during a single frame. This allows light transmission in proportion to the desired level of brightness for each pixel. To increase dynamic range, the projection light source intensity can be varied (e.g., logarithmically) for each sub-scan.

Variations and Extensions

The foregoing specific embodiments represent just some of the possibilities for practicing the present invention. Many other embodiments are possible within the spirit of the invention. For example:

A gyricon color transmissive display of the invention need not be restricted to conventional RGB or CMY/CMYK color schemes. To improve the color gamut, additional colors can be incorporated. Moreover, a special custom color can be provided, for example to ensure accurate rendering of a company logo. Also, fewer colors can be used; for example, as indicated earlier, a highlight color device can be constructed.

The electrical anisotropy of a gyricon ball need not be based on zeta potential. It is sufficient that there is an electrical dipole moment associated with the ball, the dipole moment being aligned with respect to the ball in such a way as to facilitate a useful rotation of the ball in the presence of an applied external electric field. (Typically, the dipole moment is oriented along an axis of symmetry of the ball.) Further, it should be noted that a gyricon ball can have an electrical monopole moment in addition to its electrical dipole moment, as for example when the dipole moment arises from a separation of two positive charges of different magnitudes, the resulting charge distribution being equivalent to a positive electrical monopole superposed with an electrical dipole.

Although the gyricon balls that have been described above are rotationally responsive to DC addressing voltages (whereas those disclosed by Goodrich in U.S. Pat. No. 4,261,653 are not), these balls can also respond to certain AC addressing voltages. Moreover, it will be appreciated that certain aspects of the present invention are adaptable even to gyricon displays in which the balls are rotationally responsive only to non-DC voltages (e.g., RF voltages in Goodrich's case).

The optical anisotropy of a spherical lens gyricon ball need not be based on color. Other optical properties can vary as different aspects of the gyricon ball are presented to an observer, including (but not limited to) polarization, birefringence, phase retardation, light scattering, and light reflection. In general, the gyricon balls can be used to modulate light in a wide variety of ways.

The incident light that encounters a gyricon display need not be restricted to visible light. Given suitable materials for the gyricon balls, the incident "light" can be, for example, infrared light or ultraviolet light, and such light can be modulated by the gyricon.

Color gyricon displays have been described hereinabove that provide color saturation control, for example by way of sub-scanning techniques. However, a color pixel-addressable gyricon that provides only two saturations of each color per pixel, namely, fully saturated or minimally saturated, and does not provide variable color saturation control, can nevertheless be useful. In particular, a CMY display can be built that is suitable for halftone color applications.

Color gyricon displays according to the invention can be built in many ways other than those previously described. For example, an RGB transmissive display can be built of three separate spherical lens arrays, one for each color, whose images are combined by optical arrangements similar to those used in projection television screens. As another example, for an RGB display based on aperture masks, the color can be provided by a transparent color coating or by colorants added to the fly's-eye array, rather than by using colored materials for the spherical lens ball itself.

Certain of the above-mentioned three components of the inventive technology-that is, rotatable lenses, auxiliary optics, and eggcrate substrates-can be useful in other contexts and combinations than those previously described. For example, a gyricon display having an eggcrate substrate can be made with imaging elements other than rotatable lenses. Auxiliary optics (either fly's-eye arrays or other optical elements, or any combination) can be used in a gyricon display based on imaging elements other than rotatable lenses. Rotatable-lens balls of kinds other than the ones shown here can be made, and other optical configurations for incorporating the balls into various kinds of gyricon displays can be developed.

Accordingly, the scope of the invention is not limited to the foregoing specification, but instead is given by the appended claims together with their full range of equivalents.

The claimed invention is:

1. Apparatus comprising:

a substrate having an optically transmissive window;

a plurality of particles disposed in the substrate, each particle having an anisotropy for providing an electrical dipole moment, the electrical dipole moment rendering the particle electrically responsive such that when the particle is rotatably disposed in an electric field while the electrical dipole moment of the particle is provided, the particle tends to rotate to an orientation in which the electrical dipole moment aligns with the field, a rotatable disposition of each particle being achievable while said particle is thus disposed in the substrate, said particle, when in said rotatable disposition, not being attached to the substrate, each particle, when rotatably disposed in the substrate, being disposable in first and second rotational orientations with respect to the optically transmissive window, each particle providing a first optical modulation characteristic when disposed in said first orientation with respect to a flux of optical energy through the window, each particle further providing a second optical modulation characteristic when disposed in said second orientation with respect to a flux of optical energy through the window; and an optical focusing element optically coupled to the window.

2. The apparatus of claim 1 wherein the focusing element is optically refractive.

3. The apparatus of claim 2 wherein the optically refractive focusing element comprises an array of lenses.

4. The apparatus of claim 3 wherein the array of lenses comprises an array of converging lenses.

5. The apparatus of claim 3 wherein the array of lenses comprises an array of microlenses.

6. The apparatus of claim 3 wherein the particles are disposed in an array that is registered with the lens array.

7. The apparatus of claim 1 wherein the focusing element is structurally incorporated with the window in a single unit.

8. The apparatus of claim 1 wherein the focusing element is structurally distinct from the window and is fixedly attached to the window.

9. The apparatus of claim 1 wherein the substrate contains a dielectric fluid and the particles are disposed in the substrate in contact with the fluid.

10. The apparatus of claim 9 wherein the disposition of the particles in the fluid gives rise to the respective electrical dipole moments of the particles.

11. The apparatus of claim 9 wherein the dielectric fluid is an optically transmissive fluid having a first refractive index, and each particle comprises an optically transmissive region having a second refractive index.

12. The apparatus of claim 11 wherein each particle, when disposed in at least one of said first and second rotational orientations, produces a refractive effect when illuminated by a flux of optical energy through the substrate window, the refractive effect being produced as a result of said first and second indices of refraction differing from one another.

13. The apparatus of claim 11 wherein the optically transmissive region of each particle is associated with the first optical modulation characteristic, and each particle further comprises a region having a second optical property associated with the second optical modulation characteristic.

14. The apparatus of claim 1 wherein each particle comprises a spheroidal ball.

15. The apparatus of claim 1 wherein the ball has first and second hemispheres and the first hemisphere of the ball is associated with a first zeta potential, the second hemisphere of the ball is associated with a second zeta potential, the first and second zeta potentials arising when the ball is disposed in a dielectric fluid, the first and second zeta potentials contributing to the electrical dipole moment.

16. The apparatus of claim 1 and further comprising means for producing an electric field to facilitate a rotation of at least one particle rotatably disposed in the substrate.

17. The apparatus of claim 16 wherein the electric field producing means comprises means for selectively addressing a set of particles rotatably disposed in the cavities, the set comprising at least one particle, by applying the electric field to the particles of the set and thereby facilitating a rotation of at least one particle of the set.

18. A device comprising:

a substrate comprising a matrix having a plurality of cavities, the substrate having an optically transmissive window;

an optically transmissive dielectric fluid having a first refractive index, disposed in the cavities of the matrix;

a plurality of optically anisotropic particles disposed in the cavities of the matrix in contact with the fluid, each particle having at least one optically transmissive region having a second refractive index, each particle providing a first optical modulation characteristic when disposed in the fluid in a first orientation with respect to a flux of optical energy, each particle further providing a second optical modulation characteristic when disposed in the fluid in a second orientation with respect to a flux of optical energy, each particle having an anisotropy for providing an electrical dipole moment, the electrical dipole moment rendering the particle electrically responsive such that when the particle is rotatably disposed in an electric field while the electrical dipole moment of the particle is provided, the particle tends to rotate to an orientation in which the electrical dipole moment aligns with the field, a rotatable disposition of each particle being achievable while said particle is thus disposed in the substrate, said particle, when in said rotatable disposition, not being attached to the substrate; and an optical focusing element optically coupled to the window.

19. The apparatus of claim 18 and further comprising:

means for producing an electric field to facilitate a rotation of at least one particle rotatably disposed in the substrate.

20. Apparatus comprising:

a substrate having an optically transmissive window, the substrate containing an optically transmissive dielectric fluid having a first refractive index;

a plurality of particles disposed in the substrate, each particle having at least one optically transmissive region having a second refractive index, each particle having an anisotropy for providing an electrical dipole moment, the electrical dipole moment rendering the particle electrically responsive such that when the particle is rotatably disposed in an electric field while the electrical dipole moment of the particle is provided, the particle tends to rotate to an orientation in which the electrical dipole moment aligns with the field, a rotatable disposition of each particle being achievable while said particle is thus disposed in the substrate, said particle, when in said rotatable disposition, not being attached to the substrate, each particle, when rotatably disposed in the substrate, being disposable in first and second rotational orientations with respect to the optically transmissive window, each particle providing a first optical modulation characteristic when disposed in the fluid in a first orientation with respect to a flux of optical energy through the window, each particle further providing a second optical modulation characteristic when disposed in the fluid in a second orientation with respect to a flux of optical energy through the window; and an optical modulating element optically coupled to the window.

21. The apparatus of claim 20 wherein the optical modulating element comprises an optical focusing element.

* * * * *